US008665009B2

(12) United States Patent  
Myers et al.

(10) Patent No.: US 8,665,009 B2  
(45) Date of Patent: Mar. 4, 2014

(54) INTEGRATED CIRCUIT AND METHOD FOR CONTROLLING LOAD ON THE OUTPUT FROM ON-CHIP VOLTAGE GENERATION CIRCUITRY

(75) Inventors: James Edward Myers, Cambridge (GB); Parameshwarappa Anand Kumar Savanth, Cambridge (GB); David Walter Flynn, Cambridge (GB); David William Howard, Cambridge (GB); Bal S Sandhu, Fremont, CA (US)

(73) Assignee: ARM Limited, Cambridge (GB)

( * ) Notice: Subject to any disclaimer, the term of this patent is extended or adjusted under 35 U.S.C. 154(b) by 0 days.

(21) Appl. No.: 13/562,516

(22) Filed: Jul. 31, 2012

(65) Prior Publication Data

US 2014/0035661 A1    Feb. 6, 2014

(51) Int. Cl.
   *H01J 19/82*    (2006.01)
   *G11C 5/14*    (2006.01)

(52) U.S. Cl.
   USPC ............................. 327/548; 327/530; 327/536

(58) Field of Classification Search
   USPC ......... 327/530–550, 108–112, 306, 308–310, 327/378–381, 387–388, 518, 519, 157, 327/141–147; 331/18–34, 40–41, 46–49, 331/55; 375/354–376
   See application file for complete search history.

(56) References Cited

U.S. PATENT DOCUMENTS 6,300,839 B1 * 10/2001 Bazargan et al. ............... 331/57
6,724,241 B1 *  4/2004 Bedarida et al. ............. 327/536

OTHER PUBLICATIONS

Tompson, J., et al., "2.6-GHz RF Inductive Power Delivery for Contactless On-Wafer Characterization", 2008, IEEE Conference on Microelectronic Test Structures.*
Lim, E., et al., "Novel Utilization of the Dielectric Resonator Antenna as an Osillator Load", 2007, IEEE Transactions on Antennas and Propagation.*
Guo et al. "A High Efficiency Regulated Charge Pump over Wide Input and Load Range", *IEEE 2010*, pp. 1172-1176.
Wang et al., "Efficiency Improvement in Charge Pump Circuits", *IEEE Journal of Solid-State Circuits*, vol. 32, No. 6, Jun. 1997, pp. 852-860.

(Continued)

*Primary Examiner* — Lincoln Donovan
*Assistant Examiner* — Thomas Skibinski
(74) *Attorney, Agent, or Firm* — Nixon & Vanderhye P.C.

(57) ABSTRACT

An integrated circuit and method are provided for controlling variation in the voltage output from on-chip voltage generation circuitry. The integrated circuit comprises voltage generation circuitry configured to operate from a supplied input voltage and to generate at an output node an on-chip voltage supply different to the supplied input voltage. A circuit block is then arranged to receive the on-chip voltage supply generated by the voltage generation circuitry, during operation of the circuit block the circuit block presenting a varying load on the output node. Oscillation circuitry is also coupled to the output node to provide an additional load on the output node, and is configured to produce an oscillation signal whose frequency varies as the value of the on-chip voltage supply varies. Control circuitry is configured to be responsive to a trigger condition to adjust the additional load provided on the output node by the oscillation circuitry. This provides a particularly simple and effective mechanism for providing an additional load on the output node which can be altered with the aim of offsetting variation in the load on the output node presented by the circuit block, thus allowing the variation in the voltage output from the on-chip voltage generation circuitry to be controlled.

29 Claims, 17 Drawing Sheets

(56) References Cited

OTHER PUBLICATIONS

Son et al., "Temperature-Adaptive Back-Bias Voltage Generator for an RCAT Pseudo SRAM", *ETRI Journal*, vol. 32, No. 3, Jun. 2010, pp. 406-413.
Makowski et al., "Performance Limits of Switched-Capacitor DC-DC Converters", *IEEE 1995*, pp. 1215-1221.
Rhee, "Design of High-Performance CMOS Charge Pumps in Phase-Locked Loops", *IEEE 1999*, pp. II-545-II-548.
Vitchev, "Calculating Essential Charge-Pump Parameters", *Power Electronics Technology*, Jul. 2006, pp. 30-42.
Qui, "Analog Very Large Scale Integrated Circuits Design of Two-Phase and Multi-Phase Voltage Doublers With Frequency Regulation", *Thesis—Ohio University*, 77 pages.
Ramadass, "Energy Processing Circuits for Low-Power Applications", *Thesis—Massachusetts Institute of Technology*, Jun. 2009, 205 pages.
Pylarinos, "Charge Pumps: An Overview", *Dept. of Electrical and Computer Engineering—University of Toronto*, 7 pages.

* cited by examiner

RING OSCILLATOR

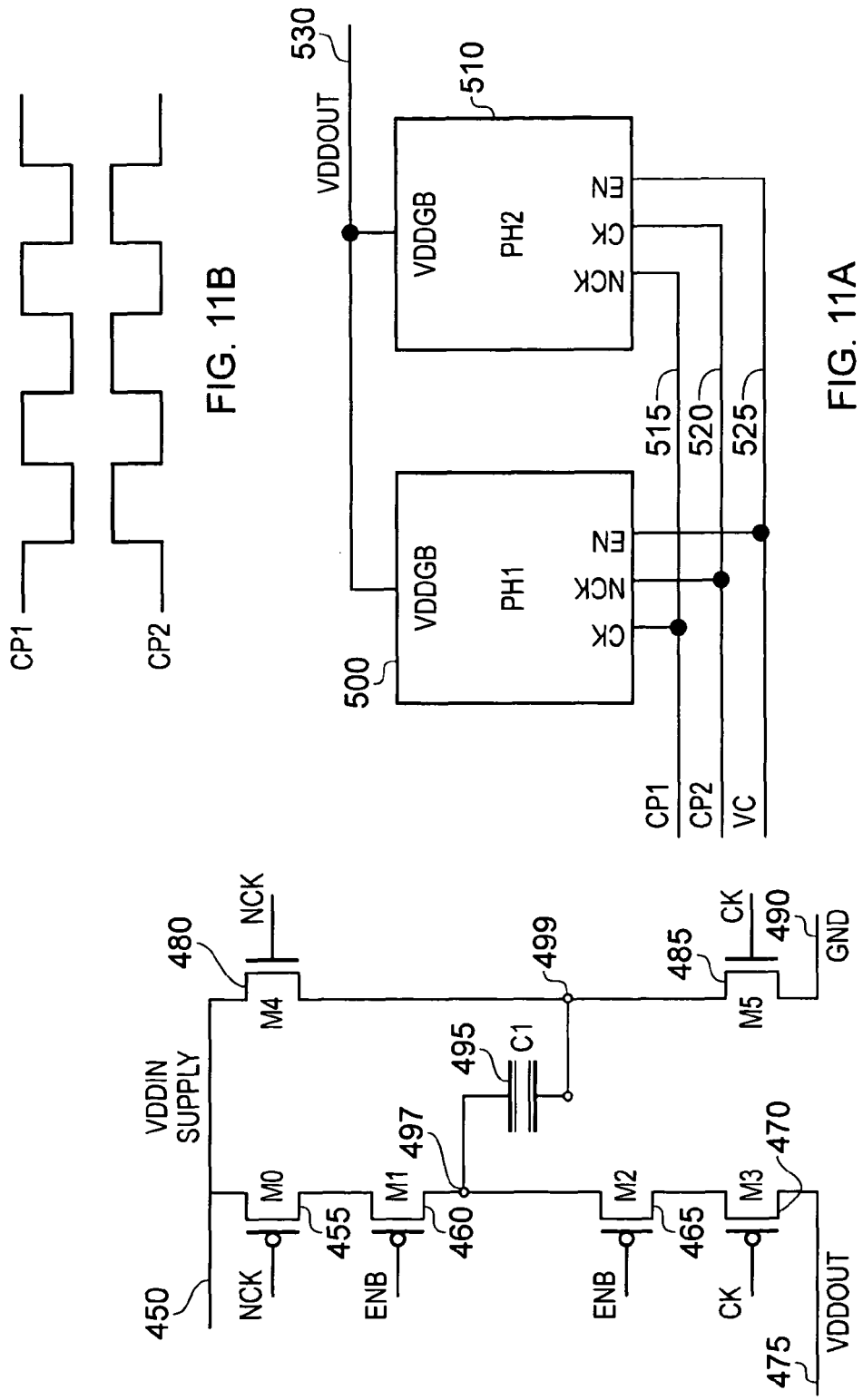

INTEGRATED CIRCUIT AND METHOD FOR CONTROLLING LOAD ON THE OUTPUT FROM ON-CHIP VOLTAGE GENERATION CIRCUITRY

When such voltage generation circuits are provided on-chip, there are many situations where the current drawn by components connected to the on-chip voltage supply generated by those voltage generation circuits is small, and this can give rise to a light loading condition on the output of the voltage generation circuitry. When such light loading occurs, this can cause the on-chip voltage supply generated by the voltage generation circuitry to increase to unsafe levels. Further, the loading on the output of the voltage generation circuitry is difficult to predict.

One known mechanism for seeking to address this issue is to use an analogue limiter circuit which dumps charge to ground when the voltage level at the output node of the voltage generation circuitry rises above a certain threshold. However, this approach is not ideal, as it kicks in suddenly and wastes significant energy.

The paper entitled "A High Efficiency Regulated Charge Pump over Wide Input and Load Range" by R Guo et al, IEEE 2010, describes an analogue control mechanism incorporating a number of voltage comparators and amplifiers, which can disable portions of the charge pump and/or gate the clock, in order to handle light loading conditions. However, such an analogue control mechanism is likely to be large, and subject to variation problems. Further, programmability is also sacrificed as the behaviour is controlled by reference voltages.

Accordingly, it would be desirable to provide an improved technique for controlling variation in the voltage output from on-chip voltage generation circuitry.

SUMMARY OF THE INVENTION

Viewed from a first aspect, the present invention provides an integrated circuit comprising: voltage generation circuitry configured to operate from a supplied input voltage and to generate at an output node an on-chip voltage supply different to said supplied input voltage; a circuit block configured to receive the on-chip voltage supply generated by the voltage generation circuitry, during operation of the circuit block, the circuit block presenting a varying load on said output node; oscillation circuitry coupled to said output node to provide an additional load on said output node and configured to produce an oscillation signal whose frequency varies as the value of the on-chip voltage supply varies; and control circuitry configured to be responsive to a trigger condition to adjust the additional load provided on the output node by said oscillation circuitry.

In accordance with the present invention, the circuit block that receives the on-chip voltage supply generated by the voltage generation circuitry presents a varying load on the output node of that voltage generation circuitry. However, the circuit block is not the only component providing a load on the output node, and in addition oscillation circuitry is coupled to the output node to provide an additional load on the output node. The oscillation circuitry produces an oscillation signal whose frequency varies as the value of the on-chip voltage supply varies. Further, in accordance with the present invention, control circuitry is configured to respond to a trigger condition by adjusting the additional load provided on the output node by the oscillation circuitry. By being able to adjust the additional load provided on the output node by the oscillation circuitry, this enables the variation in the on-chip voltage supply output from the voltage generation circuitry to be controlled, and in particular provides a mechanism for compensating for variations in the output voltage that might otherwise occur as the load presented on the output node by the circuit block varies.

The trigger condition can take a variety of forms. For example, if the circuit block has a number of different modes of operation, and the load presented on the output node varies dependent on the mode of operation, the trigger condition could be detection of a change of mode of operation of the circuit block, causing the control circuitry to adjust the additional load provided on the output node by the oscillation circuitry so as to compensate for the change in load presented by the circuit block when it changes from a current mode of operation to a new mode of operation.

However, alternatively, or in addition, the trigger condition can arise by directly monitoring the value of the on-chip voltage supply, since a variation in the load presented by the circuit block on the output node may cause a change in the voltage level of the on-chip voltage supply, and if the voltage level changes by more than a predetermined amount this can be used to activate the trigger condition. In accordance with the present invention, such functionality can be readily incorporated, since the same circuitry that is used to provide the additional load on the output node, namely the oscillation circuitry, also produces as its output a signal whose frequency varies dependent on how the on-chip voltage supply varies.

Hence, in accordance with the present invention, the oscillation circuitry can be used to provide a synthetic additional load on the output node, with the amount of that additional load being adjustable so as to compensate for variations in the load presented by the circuit block. In addition, the accumulated energy drawn by this additional load can be used in itself for a useful function, in contrast to the energy wasted by the earlier mentioned prior art analogue limiter circuit. In particular, the oscillation signal produced by the oscillation circuitry has a frequency that varies as the value of the on-chip voltage supply varies, and hence this output can itself be used if desired to determine when to initiate the trigger condition, and hence when to adjust the amount of additional load provided on the output node by the oscillation circuitry.

In one embodiment, the control circuitry further comprises monitoring circuitry configured to monitor the oscillation signal in order to monitor variation in a value of the on-chip voltage supply generated by the voltage generation circuitry; and the monitoring circuitry is configured to be responsive to at least one predetermined variation in the oscillation signal to indicate the trigger condition. The control circuitry is then responsive to the trigger condition to cause the power consumption of the oscillation circuitry to be varied in order to vary the amount of the additional load on the output node. Hence, in such embodiments, monitoring circuitry is provided which monitors the variation in the oscillation signal in order to determine whether to indicate the trigger condition. When the trigger condition does arise, the power consumption of the oscillation circuitry is varied so as to vary the amount of the additional load. This provides a very simple and effective mechanism for controlling variation in the voltage output from the on-chip voltage generation circuitry.

The at least one predetermined variation that the monitoring circuitry monitors for can take a variety of forms. However, in one embodiment said at least one predetermined variation in the oscillation signal comprises a predetermined variation indicating that the value of the on-chip voltage supply has increased beyond a predetermined level, and the control circuitry is responsive to detection of said predetermined variation by the monitoring circuitry to cause the power consumption of said oscillation circuitry to be increased, thereby increasing the amount of said additional load on said output node. Hence, in such embodiments, a low loading condition can be readily detected, since when the load presented by the circuit block is low, the voltage output from the voltage generation circuitry is likely to increase, and if unchecked can run away to unsafe levels. However, in accordance with the above described embodiment, as soon as it is detected that the on-chip voltage supply has increased beyond a predetermined level, the control circuitry causes the power consumption of the oscillation circuitry to be increased, thereby increasing the overall load on the output node. This increase in the additional load provided by the oscillation circuitry should cause the voltage level to drop. In some embodiments, this measure may be sufficient by itself to alleviate the risk of the output voltage from the voltage generation circuitry increasing to unsafe levels, but in alternative embodiments this measure can be used in combination with one or more other measures, such as adjusting the settings of the voltage generation circuitry, in order to constrain the voltage to safe levels during periods of low loading from the circuit block.

The voltage generation circuitry can take a variety of forms, but in one embodiment comprises charge pump circuitry which is configured to generate the on-chip voltage supply in a manner which results in the value of that on-chip voltage supply increasing as the load on the output node decreases.

The control circuitry can take a variety of forms, but in one embodiment the control circuitry further comprises coupling circuitry configured to couple the oscillation circuitry to the output node and to generate an operating voltage for the oscillation circuitry from the on-chip voltage supply. The control circuitry is then configured to be responsive to detection of said at least one predetermined variation by the monitoring circuitry to cause the coupling circuitry to vary the operating voltage for the oscillation circuitry in order to vary the amount of the additional load on the output node. Hence, in such embodiments, the coupling circuitry is used to provide an operating voltage for the oscillation circuitry which varies as the on-chip voltage supply varies, thus ensuring that the frequency of the oscillation signal produced by the oscillation circuitry varies as the value of the on-chip voltage supply varies. However, the actual nominal value of the operating voltage can be varied by the coupling circuitry so as to vary the power consumption and hence the amount of additional load presented on the output node due to operation of the oscillation circuitry. Hence, by way of example, in the absence of the trigger condition, the operating voltage may be chosen to be at a first level lower than the level of the on-chip voltage supply causing the oscillation circuitry to oscillate relatively slowly and hence consume less power. Hence, the amount of the additional load in such circumstances will be relatively low. However, on detection of the trigger condition, the coupling circuitry may be arranged to increase the level of the operating voltage to a second level nearer that of the on-chip voltage supply, thereby increasing the power consumption and increasing the amount of the additional load. In those circumstances, the frequency of the oscillation will then be relatively fast compared with the frequency of the oscillation prior to detection of the trigger condition.

The coupling circuitry can take a variety of forms. However, in one embodiment, the coupling circuitry comprises a plurality of switch elements connected in parallel between the output node and a supply line providing the operating voltage for the oscillation circuitry, initially a chosen subset of said plurality of switch elements being turned on, but on detecting said at least one predetermined variation, the control circuitry altering which switch elements of said plurality are turned on in order to vary the resistance of the coupling circuitry. The individual switch elements may all exhibit similar resistance, and different numbers of switch elements may be turned on dependent on whether the trigger condition has been detected or not. Alternatively, certain switch elements may have different resistances to other switch elements, so that the overall number of switch elements used does not change, but different switch elements are used dependent on whether the trigger condition has been detected or not.

The switch elements can take a variety of forms, but in one embodiment each switch element comprises at least one transistor.

When monitoring for variation in the on-chip voltage supply, it is useful to distinguish between variation caused by a change in load presented by the circuit block and any variation that may be due to a change in the supplied input voltage. In one embodiment, this can be achieved by arranging the oscillation circuitry to be alternately coupled to said output node and to an input node providing the supplied input voltage, when coupled to the input node the oscillation circuitry being configured to produce a reference oscillation signal indicative of the supplied input voltage. The monitoring circuitry then includes comparison circuitry configured to compare the oscillation signal and the reference oscillation signal in order to produce a comparison output, and the monitoring circuitry is configured to monitor variation in the comparison output in order to detect said at least one predetermined variation. Such an approach provides a power and area efficient solution, but the sampling frequency is somewhat impacted, since at any point in time the oscillation signal from the oscillation circuitry is only providing information about the voltage at either the output node or the input node.

To improve the sampling frequency, and hence provide a higher bandwidth solution, the integrated circuit may alternatively further comprise reference oscillation circuitry coupled to an input node providing the supplied input voltage and configured to produce a reference oscillation signal indicative of the supplied input voltage. The monitoring circuitry then includes comparison circuitry configured to compare the oscillation signal and the reference oscillation signal in order to produce a comparison output, and the monitoring circuitry is configured to monitor variation in the comparison output in order to detect said at least one predetermined variation. In this embodiment, the oscillation signal and reference oscillation signal are being produced in parallel and hence this produces a more accurate comparison output.

In one such embodiment, the control circuitry further comprises first coupling circuitry configured to couple the oscillation circuitry to the output node and to generate an operating voltage for the oscillation circuitry from the on-chip voltage supply, and second coupling circuitry configured to couple the reference oscillation circuitry to the input node and to generate an operating voltage for the reference oscillation circuitry from the supplied input voltage. The control circuitry is then configured to be responsive to detection of said at least one predetermined variation by the monitoring circuitry, to cause the first coupling circuitry and second coupling circuitry to alter the operating voltage for both the oscillation circuitry and the reference oscillation circuitry. Hence, in such embodiments, separate coupling circuits are provided for both the oscillation circuitry and the reference oscillation circuitry, with those two coupling circuits being commonly controlled by the control circuitry so that any changes in the operating voltage are made at the same time for both the oscillation circuitry and the reference oscillation circuitry.

In embodiments where a detection that the on-chip voltage supply has increased beyond a predetermined level causes the control circuitry to increase the power consumption of the oscillation circuitry, the monitoring circuitry may be further configured, after causing the power consumption of said oscillator to be increased, to continue to monitor the oscillation signal, and the control circuitry is then responsive to the monitoring circuitry determining from the oscillation signal that the value of the on-chip voltage supply has decreased below said predetermined level for a predetermined period of time, to cause the power consumption of the oscillation circuitry to be reduced, thereby reducing the amount of the additional load on the output node. Hence, in such embodiments, the detection of the trigger condition causes the control circuitry to temporarily increase the power consumption of the oscillation circuitry so as to temporarily increase the amount of the additional load on the output node until such time as the on-chip voltage supply has decreased below the predetermined level for a certain amount of time, whereafter the power consumption of the oscillation circuitry is then reduced in order to reduce the amount of the additional load on the output node. In one embodiment, at this time the power consumption is reduced back to the level that it was at prior to the trigger condition being detected.

In addition to the above-described mechanism that varies the additional load presented on the output node by the oscillation circuitry in order to seek to offset variations in load on the output node presented by the circuit block, one or more additional mechanisms can also be used. For example, in one embodiment, the control circuitry is configured to monitor the variation in value of the oscillation signal relative to an initial value of said oscillation signal that is indicative of a desired value for said on-chip voltage supply, and to adjust one or more settings of the voltage generation circuitry if said variation exceeds a threshold amount with the aim of reducing said variation back below said threshold amount. The threshold amount referred to here that causes one or more settings of the voltage generation circuitry to be adjusted if that threshold amount is exceeded, will in one embodiment be different to the at least one predetermined variation that indicates the trigger condition and causes the power consumption of the oscillation circuitry to be varied. In particular, in one embodiment, this threshold amount may be lower than the predetermined variation indicating the trigger condition, such that the settings of the voltage generation circuitry are adjusted in the first instance with the aim of reducing the variation back below the threshold amount, and only if the variation increases further to a level indicating the trigger condition, is the power consumption of the oscillation circuitry varied in order to vary the amount of the additional load on the output node.

The one or more settings of the voltage generation circuitry that are adjusted if the variation exceeds the threshold amount can take a variety of forms, and for example may involve adjusting the clock signal provided to the voltage generation circuitry. However, in one embodiment the voltage generation circuitry comprises charge pump circuitry that can be operated in a plurality of modes of operation, and hence the settings that may be adjusted can include settings indicating which mode of operation the charge pump should be operated in.

In one embodiment, the voltage generation circuitry comprises charge pump circuitry formed as a plurality of charge pump units, each of which is enabled by an associated enable signal, the charge pump circuitry being operable in a plurality of modes of operation, each mode of operation being selected by an associated pattern of values of the enable signals such that the charge pump units used, and hence a drive strength of the charge pump circuitry, varies dependent on the mode of operation. The one or more settings adjusted by the control circuitry may then comprise at least the values of the enable signals associated with the charge pump units of said plurality. In one embodiment, the individual charge pump units are logically arranged in parallel, and hence by varying the number of charge pump units used, this directly affects the drive strength of the charge pump circuitry, and hence the output voltage generated by the charge pump circuitry. Such a novel arrangement of charge pump circuitry hence allows the drive strength of the charge pump circuitry to be varied in situ during operation, taking account of the load on the output node. Additionally, the programmable enable signals allow field programmability to compensate for process skews, temperature and voltage variations, and hence the novel arrangement provides a particularly flexible charge pump circuit for using on-chip.

In one embodiment, each charge pump unit comprises at least one charge pump block, each charge pump block comprising: a first plurality of transistors arranged in series between said output node and an input node providing the supplied input voltage, and providing a first intermediate node; a second plurality of transistors arranged in series between said input node and a reference voltage, and providing a second intermediate node; a capacitor element connected between said first intermediate node and said second intermediate node; during a charging phase of operation at least one transistor in said first plurality and at least one transistor in said second plurality being activated to operate as charging transistors coupling the capacitor between said input node and said reference voltage; and during a discharging phase of operation at least one other transistor in said first plurality and at least one other transistor in said second plurality being activated to operate as discharging transistors coupling the capacitor between said input node and said output node.

In one particular embodiment, the transistors in said second plurality are of a same type, said at least one transistor in said second plurality is activated during the charging phase by a first phase of a clock signal, and said at least one other transistor in said second plurality is activated during the discharging phase by a second phase of said clock signal, said first and second phases being complementary phase. By using transistors of the same type within the second plurality of transistors connected between the input node and the reference voltage, it is possible to avoid the use of complex non-overlapping clock generators used in certain known prior art techniques to avoid the possibility of shorting the supplied input voltage and the reference voltage (the reference voltage typically being a ground voltage supply).

In one particular embodiment, the transistors in the second plurality are NMOS transistors. Hence, since the at least one transistor in the second plurality that is activated during the charging phase is an NMOS transistor, the short circuit potential is limited by the threshold voltage drop across that at least one transistor. Further, comparatively small device sizes can be used for the transistors in the second plurality, which limits the current.

In one embodiment, at least one of said first plurality of transistors and said second plurality of transistors include enable transistors activated by the enable signal associated with the charge pump unit.

In one particular embodiment, the first plurality of transistors includes said enable transistors, and during the charging phase, multiple transistors from said first plurality, including a first enable transistor, are used in a stacked arrangement to form the charging transistors from said first plurality. Further, during the discharging phase, multiple transistors from said first plurality, including a second enable transistor, are used in a stacked arrangement to form the discharging transistors from said first plurality. Such a stacked arrangement avoids the use of bulky level shifters to drive the gates of the discharge transistors in the first plurality.

In one embodiment, the transistors in the first plurality are PMOS transistors.

In one embodiment, each charge unit comprises first and second charge pump blocks arranged in parallel with respect to said output node, the first charge pump block being configured to be in said charging phase during a first half of a clock cycle, and the second charge pump block being configured to be in said charging phase during a second half of said clock cycle. Such an approach reduces output ripple and improves regulation.

The oscillator circuitry can take a variety of forms, but in one embodiment the oscillator circuitry is formed as a ring oscillator.

It is often the case that on-chip voltage generation circuits, particularly charge pumps, provide low load currents, and are susceptible to droops in the output voltage for intermittent load currents. Certain forms of circuit block that may be configured to receive the on-chip voltage supply generated by such voltage generation circuits may be sensitive to any such droop in the voltage. Typical examples of such a circuit block are circuitry used for power gating and body-bias applications. However, it would be desirable to use the techniques of the earlier described embodiments when using the voltage generation circuitry to provide an on-chip voltage supply to such circuit blocks. In accordance with one embodiment, this is achieved through the use of droop prevention circuitry. In particular, in one embodiment, the control circuitry further comprises droop prevention circuitry configured, when in a start-up mode, to disconnect an output interface of the voltage generation circuitry from the output node during a start-up stage of the voltage generation circuitry. By such an approach, the voltage of the on-chip voltage supply can be allowed to settle completely before it is connected to the current demand of the circuit block.

In one embodiment, in the start-up mode the droop prevention circuitry is further configured to pre-charge the output node to said supplied input voltage. Hence, during said start-up mode, the circuit block receives the supplied input voltage.

In one embodiment, following the start-up mode, the control circuitry places the droop prevention circuitry in a live mode where the output interface of the voltage generation circuitry is reconnected to the output node. Accordingly, at this point, the circuit block is actively connected to the output from the voltage generation circuitry, and hence the voltage supply that it receives then increases from the supplied input voltage level up to the level of the on-chip voltage supply generated by the voltage generation circuitry. Such an approach avoids any droop in the level of the on-chip voltage supply since the output from the voltage generation circuitry has been allowed to stabilise before being connected to the current load of the circuit block.

In one embodiment, when the voltage generation circuitry is not being used, the control circuitry is configured to disconnect the output interface of the voltage generation circuitry from the output node, and to precharge the output interface to said supplied input voltage. Such an approach ensures the voltage at the output interface of the voltage generation circuitry does not float when the charge pump is disabled.

The circuit block using the output voltage from the voltage generation circuitry can take a variety of forms, but in one embodiment comprises a series of power switches that are driven by said on-chip supply voltage in a predetermined mode of operation. Typically, the on-chip supply voltage is provided to the gate of each of the power switches in the series. In one example embodiment, the power switches may be header switches, and the predetermined mode of operation in which they are driven by the on-chip supply voltage may be a super cut-off mode of operation. In an alternative embodiment the predetermined mode of operation may be a boosted gate mode of operation used with a variety of power switches.

Whilst the on-chip voltage supply generated by the voltage generation circuitry may be greater or lower than the supplied input voltage, in one embodiment the on-chip voltage supply is greater than the supplied input voltage.

Viewed from a second aspect, the present invention provides circuitry for use in an integrated circuit to control variation in a value of an on-chip voltage supply generated at an output node by voltage generation circuitry of the integrated circuit from a supplied input voltage, the integrated circuit having a circuit block configured to receive the on-chip voltage supply generated by the voltage generation circuitry, during operation of the circuit block, the circuit block presenting a varying load on said output node, the circuitry comprising: oscillation circuitry coupled to said output node to provide an additional load on said output node and configured to produce an oscillation signal whose frequency varies as the value of the on-chip voltage supply varies; and control circuitry configured to be responsive to a trigger condition to adjust said additional load provided on said output node by said oscillation circuitry.

Viewed from a third aspect the present invention provides a method of controlling variation in a value of an on-chip voltage supply generated at an output node by voltage generation circuitry of an integrated circuit from a supplied input voltage, the integrated circuit having a circuit block arranged to receive the on-chip voltage supply generated by the voltage generation circuitry, during operation of the circuit block, the circuit block presenting a varying load on said output node, the method comprising: employing oscillation circuitry coupled to said output node to provide an additional load on said output node, the oscillation circuitry producing an oscillation signal whose frequency varies as the value of the on-chip voltage supply varies; and adjusting, in response to a trigger condition, said additional load provided on said output node by the oscillation circuitry.

Viewed from a fourth aspect the present invention provides an integrated circuit comprising: voltage generation means for operating from a supplied input voltage and for generating at an output node an on-chip voltage supply different to said supplied input voltage; circuit means for receiving the on-chip voltage supply generated by the voltage generation means, during operation of the circuit means, the circuit means presenting a varying load on said output node; oscillation means for coupling to said output node to provide an additional load on said output node, and for producing an oscillation signal whose frequency varies as the value of the on-chip voltage supply varies; and control means for adjusting, in response to a trigger condition, the additional load provided on the output node by said oscillation means.

BRIEF DESCRIPTION OF THE DRAWINGS

The present invention will be described further, by way of example only, with reference to embodiments thereof as illustrated in the accompanying drawings, in which:

FIG. 10 is a diagram illustrating a charge pump block used in one embodiment;

FIG. 11A illustrates a charge pump unit of one embodiment, constructed using two instances of the charge pump block of FIG. 10;

FIG. 11B is a timing diagram illustrating the two clock signals used by the circuitry of FIG. 11A in one embodiment;

DESCRIPTION OF EMBODIMENTS

Figure 1:
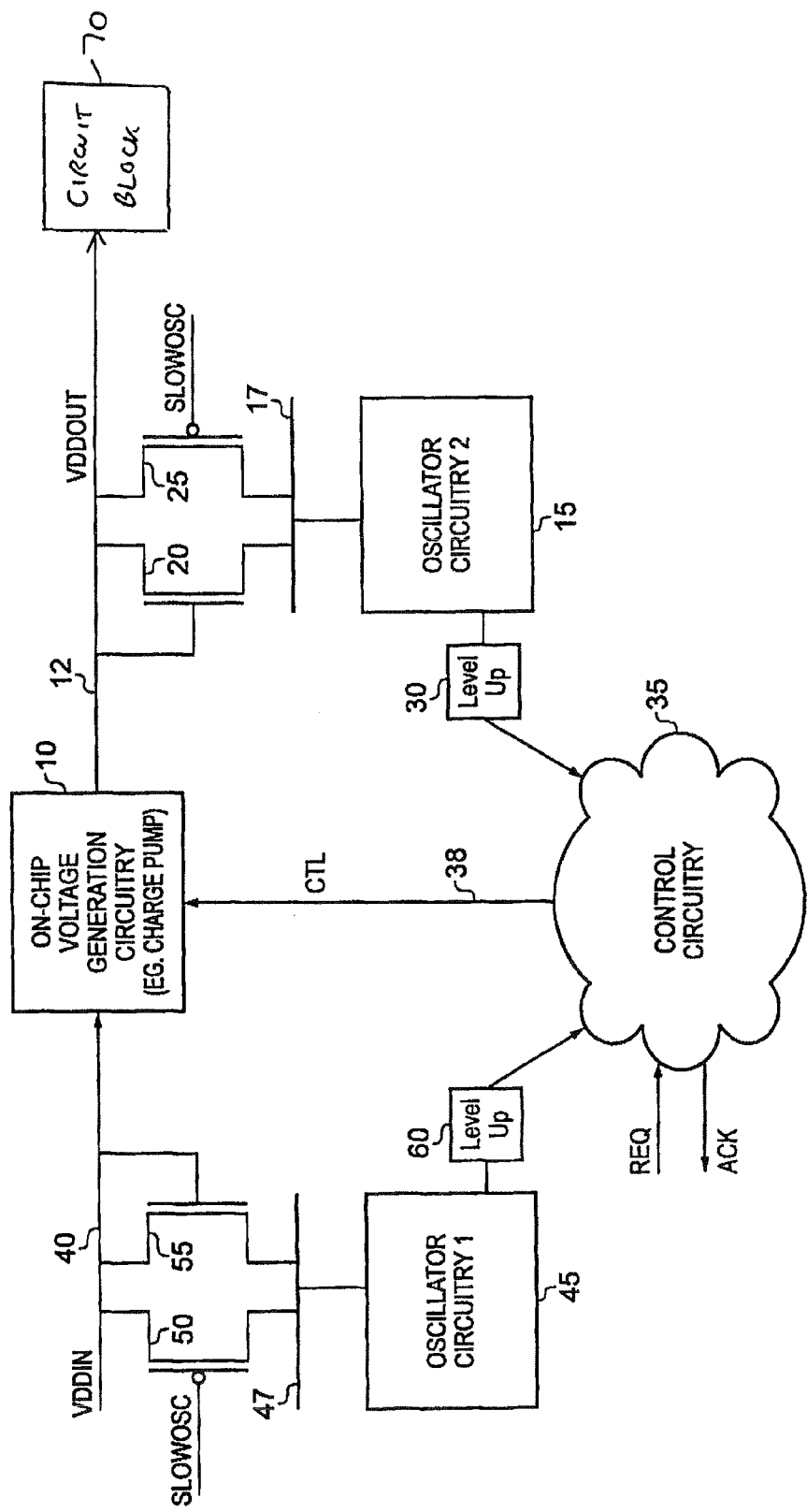
FIG. 1 is a block diagram of an apparatus in accordance with one embodiment.

FIG. 1 is a block diagram of an apparatus in accordance with one embodiment, that may be provided within an integrated circuit to provide a mechanism for controlling variation in the voltage output from on-chip voltage generation circuitry 10. Whilst the on-chip voltage generation circuitry 10 can take a variety of forms, for the purposes of the following discussion it will be assumed that this circuitry takes the form of a charge pump. The charge pump 10 receives a supplied input voltage VDDIN on path 40 and, when active, generates a boosted output voltage VDDOUT over path 12. Control circuitry 35 is provided which can generate one or more control signals over path 38 to the charge pump 10, for example to control the clock speed of the control pump, and/or in one embodiment to control which of a plurality of modes of operation the charge pump operates in (a charge pump supporting such multiple modes of operation being described later with reference to FIGS. 10 to 14).

One or more circuits within the integrated circuit (such as circuit block 70 shown in FIG. 1) will be arranged to receive the output voltage from the charge pump, and the manner in which that voltage is used by those circuits will depend on the nature of those circuits. In some instances, the output voltage from the charge pump may be used as a supply voltage for the recipient circuitry, whilst in alternative embodiments it may be used as a control voltage, for example used to drive the gate of various transistors within that circuitry. It is often the case that the circuitry that receives the output voltage from the charge pump will present a varying load on the output node of the charge pump, i.e. the node connected to the output path 12. This loading is difficult to predict, but variations in the loading will tend to affect the voltage level of the output voltage from the charge pump. Of particular concern is a situation where the loading of the circuitry drops to a low loading level, since in that scenario the output voltage from the charge pump can run away to unsafe levels. The circuitry shown in FIG. 1 provides an efficient mechanism for both monitoring the variation, and seeking to control that variation in order to compensate for the varying load on the output node due to the circuitry utilising the charge pump's output voltage.

In particular, coupling circuitry in the form of a pair of transistors 20, 25 is provided in order to produce an operating voltage on the supply rail 17 for the oscillator circuitry 15. As shown in FIG. 1, the NMOS transistor 20 will be permanently on when the output voltage is being produced by the charge pump, but the PMOS transistor 25 can be selectively on or off dependent on the value of the slowosc signal received at its gate. As will be discussed in more detail later, by default the slowosc signal is asserted at a logic one level, turning off the PMOS transistor 25. When the PMOS transistor is turned off, the voltage level on the rail 17 will be lower than will be the case when the PMOS transistor 25 is turned on, since the overall resistance through the coupling circuitry will be greater when the PMOS transistor is turned off. Accordingly, in the default scenario where the slowosc signal is asserted, the oscillator circuitry 15 will operate from a relatively low voltage level, and accordingly will oscillate at a lower frequency. As a result, the load presented on the output node of the charge pump due to the oscillator circuitry 15 will be relatively low. However, when the slowosc signal is de-asserted, the PMOS transistor 25 will be turned on reducing the resistance of the coupling circuitry, and causing the voltage on the rail 17 to increase. This will cause the oscillator circuitry 15 to oscillate with a higher frequency, and present an increased load on the output node. Accordingly, it can be seen that the coupling circuitry enables control of the amount of load presented at the output node of the charge pump due to the operation of the oscillator circuitry 15.

However, the oscillator circuitry does not merely provide a mechanism for providing a varying load on the output node, but also naturally produces an oscillation signal whose frequency varies as the value of the on-chip voltage supply output from the charge pump varies. This oscillation signal is passed through level up circuitry 30 which performs a level shifting operation to shift the signals into the voltage domain of the control circuitry 35, whereafter the signal is provided to the control circuitry 35. Accordingly, the control circuitry 35 receives the oscillation signal output from the oscillator circuitry 15, with variations in the frequency of the oscillation signal being indicative of variations in the voltage output from the charge pump over path 12.

Whilst there will be variations in the voltage at the output node of the charge pump due to the varying load presented by the circuits utilising that charge pump output, the supplied input voltage over path 40 should remain relatively stable, and hence can be used as a reference by the control circuitry 35. In particular, a similar coupling circuitry formed of transistors 50, 55 can be provided to produce on the rail 47 a supply voltage for a further oscillator circuitry 45, in one embodiment this oscillator circuitry 45 being identically constructed to the oscillator circuitry 15. The coupling circuitry consisting of the transistors 50, 55 operates in an identical manner to the coupling circuitry consisting of the transistors 20, 25, and in particular the PMOS transistor 50 receives the same slowosc signal as is received by the PMOS transistor 25. The output from the oscillator circuitry 45 is passed through level up circuitry 60 in order to provide a reference oscillation signal to the control circuitry 35.

The operation of the control circuitry will be discussed in more detail later, but in essence the control circuitry is able to compare the two oscillation signals that it receives in order to evaluate variations in the voltage level on output path 12. If the variation between the two oscillation signals exceeds a predetermined level, indicative of the voltage level on the output path 12 exceeding some predetermined threshold, then the slowosc signal is de-asserted, in order to turn on both the PMOS transistors 25 and 50. As a result, the operating voltage for both oscillator circuits will increase, at which point the oscillator 15 will present an increased loading on the output node 12 with the aim of causing the output voltage level to decrease. Hence, by increasing the voltage provided to the oscillator circuitry 15, this can counteract any decrease in loading presented by the circuitry utilising the output voltage from the charge pump, and thereby inhibit the increase in the output voltage from the charge pump that would otherwise take place. Furthermore, both oscillator circuits still continue to provide useful information to the control circuitry, and if subsequently it is determined that the voltage level of the output path 12 has dropped back to a safe level for a predetermined period of time, then the slowosc signal can be reasserted in order to reduce the power consumption of the oscillator circuits, and reduce their loading on the respective input and output nodes.

Figure 2:
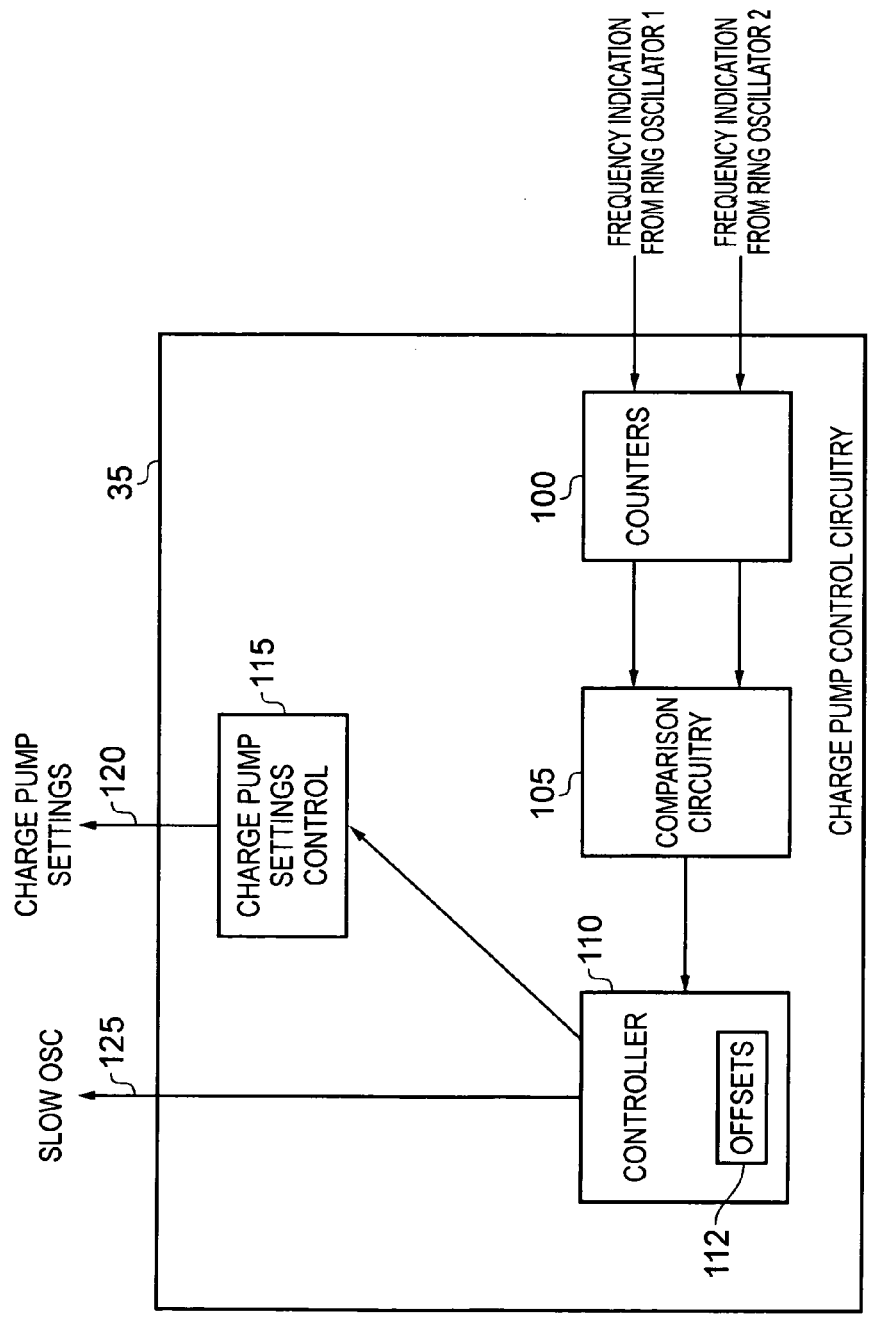
FIG. 2 is a block diagram illustrating in more detail the operation of the control circuitry of FIG. 1 in accordance with one embodiment.

FIG. 2 is a block diagram schematically illustrating the charge pump control circuitry 35 of FIG. 1 is accordance with one embodiment. The counter circuitry 100 is configured to receive the oscillation signals from both of the oscillator circuits 15, 45, and to derive count values therefrom dependent on the frequency of oscillation. These count values are then forwarded to comparison circuitry 105, which compares the two count values in order to determine a comparison output for input to the controller 110. The comparison output can take a variety of forms, but in one embodiment they merely take the form of a value indicative of how much faster the oscillation signal from the oscillation circuitry 15 is relative to the oscillation signal from the oscillator circuitry 45. The output from the oscillator circuitry 15 should be quicker, since the output voltage from the charge pump 12 should be a boosted version of the input voltage over path 40. One or more offsets 112 can be stored within the controller to indicate the expected value of the comparison output assuming the output voltage from the charge pump is at the required level. In one embodiment, two different offsets can be provided, one for use when both of the oscillator circuits are operating whilst the slowosc signal is asserted and another to be referenced when both of the oscillator circuits are operating with the slowosc signal de-asserted. With reference to the appropriate offset, the controller can then determine whether the output voltage of the charge pump on path 12 is above or below the desired level.

As will be discussed in more detail with reference to FIGS. 3, 4A and 4B, the controller may be able to adjust various charge pumps settings via control signals issued over path 38, in order to seek to introduce corrective measures for minor variations in the output voltage. For example, in one embodiment, the clock frequency of the charge pump circuitry may be altered. In addition, in an alternative embodiment to be discussed later with reference to FIGS. 10 to 14, the charge pump may be able to be operated in a plurality of different modes of operation, where each mode produces an output voltage at a different level, and the control circuitry may switch the charge pump between the different modes of operation in order to seek to control the voltage.

Nevertheless, in some instances, such as where the loading presented on the output node by the circuits utilising the charge pump's output voltage drops suddenly, the output voltage from the charge pump may increase relatively quickly, and if the controller 110 detects that the level has increased beyond a certain threshold, it can then de-assert the slowosc signal to turn on the PMOS transistors 50, 25 of the two coupling circuits, and thereby increase the operating voltage of the oscillator circuits, and hence their associated loading on the input and output nodes, respectively. This additional loading on the output node 12 will assist in reducing the output voltage from the charge pump, and in particular may be used by itself, or in combination with the charge pump setting control options, to seek to bring the voltage level back below that threshold. As shown in FIG. 2, the controller 110 can issue signals to the charge pump settings control block 115, in order to cause control signals to be issued over path 120 to the charge pump. In addition, the controller 110 can issue over path 125 the slowosc signal, and can accordingly assert and de-assert that signal as it considers appropriate having regards to the comparison output data received from the comparison circuitry 105.

Figure 3:
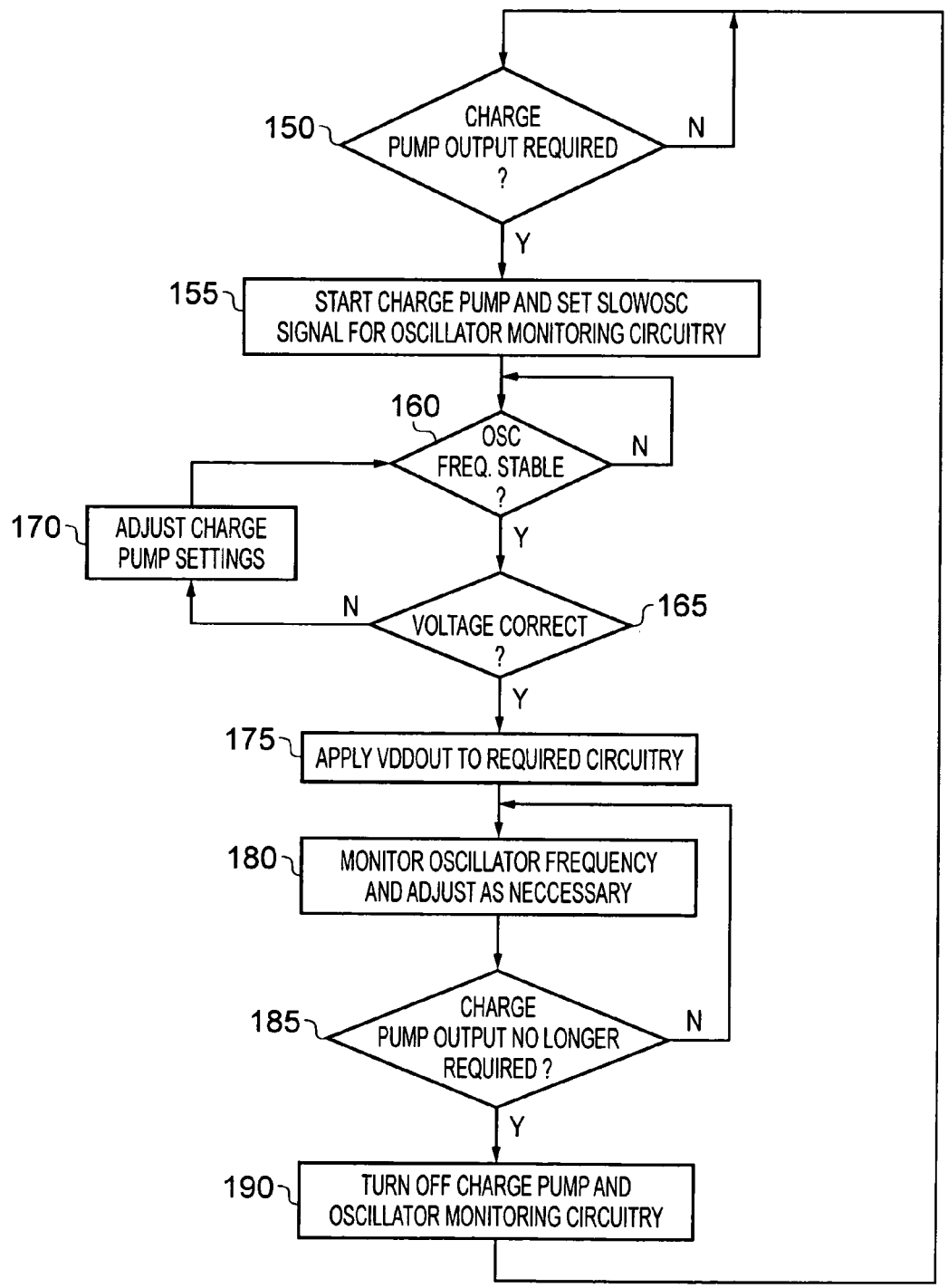
FIG. 3 is a flow diagram illustrating the operation of charge pump circuitry in accordance with one embodiment.

FIG. 3 is a flow diagram illustrating the operation of the charge pump circuitry in accordance with one embodiment. At step 150, it is determined whether a charge pump output voltage is required, in one embodiment this being indicated by the assertion of a request signal input to the charge pump control circuitry 35. Once an asserted request is received, the charge pump is turned on and the slowosc signal is asserted at step 155, thereby causing the oscillator monitoring circuitry consisting of the two oscillator circuits 15, 45 to operate at a lower voltage than would be the case if the slowosc signal were de-asserted. Hence, at this stage the oscillator circuits present a relatively small load on their respective output and input nodes of the charge pump.

At step 160, it is determined whether the oscillation frequency is stable, this being determined by the control circuitry 35 with reference to the output from the oscillator circuits 15, 45. Once the oscillation frequencies are stable, it is then determined at step 165 whether the voltage at the output of the charge pump is at the desired level. As discussed earlier, this can be determined by the controller 110 with reference to the relevant offset 112. If not, then the relevant charge pump settings are adjusted at step 170 by issuing appropriate control signals over path 38. In one embodiment, this can take the form of adjustments made to the clock signal controlling the charge pump, but as discussed earlier may also adjust the mode of operation of the charge pump. The process then returns to step 160 to determine whether the oscillation frequency is still stable. Once it is determined that the oscillation frequency is stable, and the correct voltage is being output from the charge pump, then the VDDOUT voltage on path 12 can be applied to the required circuitry at step 175. At this point, an asserted acknowledge signal will be returned from the charge pump control circuitry 35 to the requesting circuitry.

Thereafter, at step 180, the control circuitry 35 monitors the oscillator frequency and performs adjustments as necessary by either adjusting the charge pump settings or de-asserting or re-asserting the slowosc signal. The process performed at step 180 will be discussed in more detail later with reference to FIGS. 4A and 4B.

At step 185, it is determined whether the charge pump output is no longer required. In one embodiment this can be determined by monitoring the request signal which can take the form of a level sensitive signal which will be maintained in an asserted state for the duration that the charge pump output is required, and will then be de-asserted when the charge pump output is no longer required. Assuming the charge pump output is still required, the process returns to step 180, but once it is determined that the charge pump output is no longer required the process proceeds at step 190 where the charge pump is turned off and in addition the oscillator monitoring circuitry 15, 45 is turned off. The process then returns to step 150.

Figure 4A:
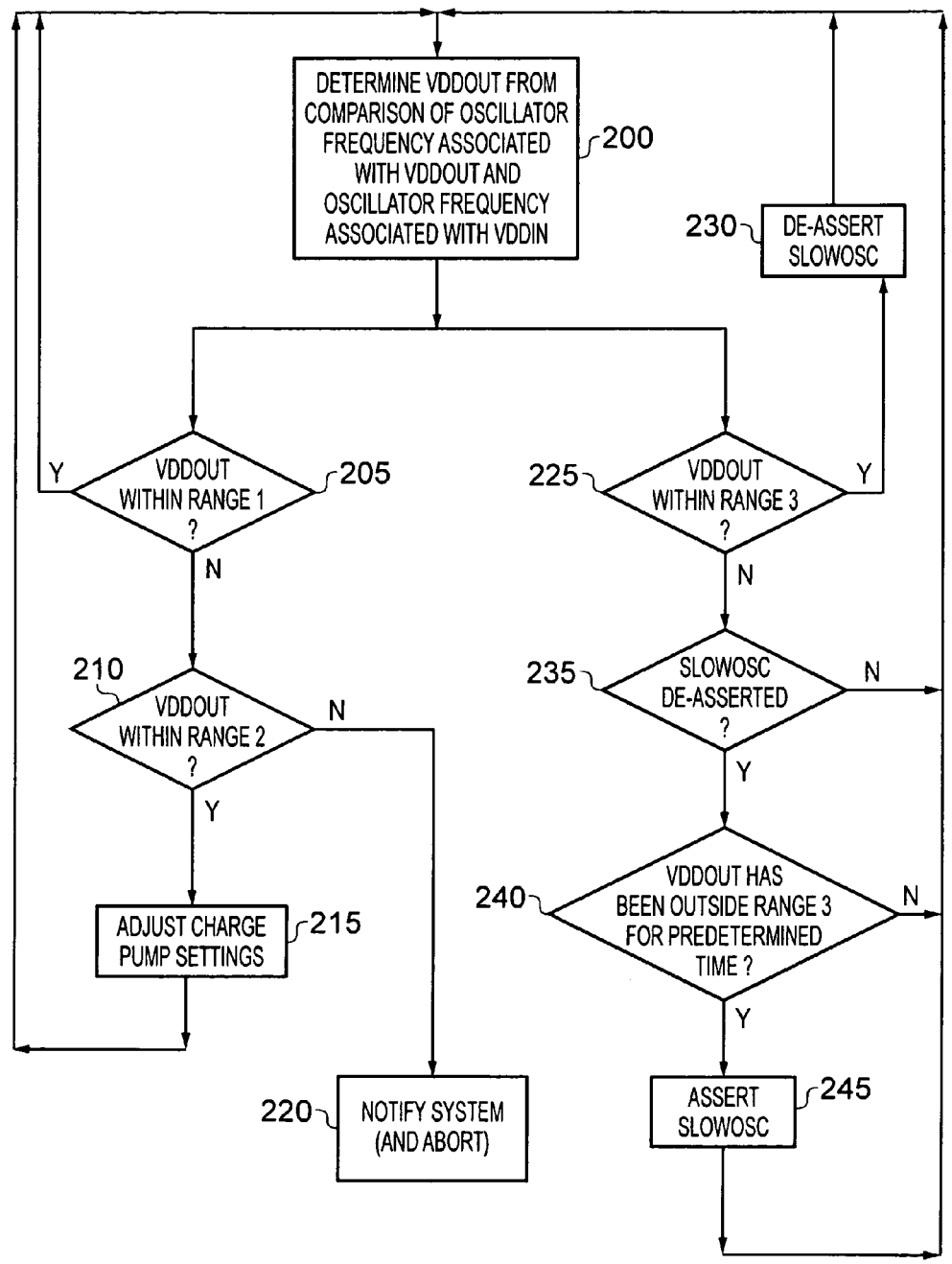
FIG. 4A is a flow diagram illustrating how the oscillator frequency is monitored and resultant adjustments made, in accordance with one embodiment.
Figure 4B:
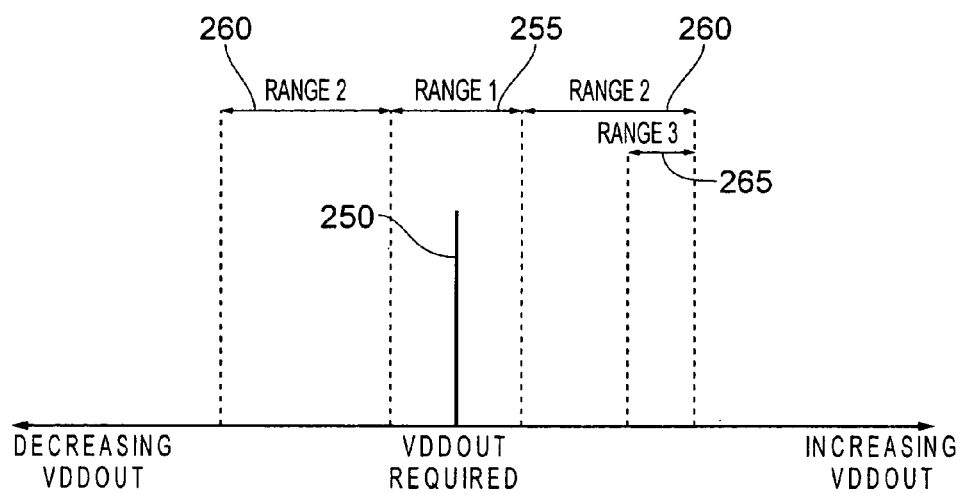
FIG. 4B is a chart illustrating in schematic form the ranges referred to in FIG. 4A.

FIG. 4A is a flow diagram illustrating in more detail the steps performed to implement step 180 of FIG. 3, whilst FIG. 4B is a graph illustrating the various ranges referred to in FIG. 4A. In particular, considering first FIG. 4B, if the voltage 250 indicates the required output voltage from the charge pump, there will be a range 1 255 such that if the output varies within that range no action is required by the control circuitry 35. However, if the output voltage strays into range 2 260, then the control circuitry 35 will make charge pump setting adjustments to seek to bring the voltage back within range 1 255. If the voltage increases to within range 3 265, then the slowosc signal will be de-asserted to cause the oscillator to consume more power and provide an increased load on the output node of the charge pump. Range 3 has no upper limit.

Considering FIG. 4A, at step 200 the control circuitry 35 determines the output voltage level from a comparison of the oscillator frequency associated with VDDOUT and the oscillator frequency associated with VDDIN. Both the left hand side and the right hand side steps of FIG. 4A then occur in parallel. Considering first the left hand side, it is determined at step 205 whether VDDOUT is within range 1. If so, the process merely returns to step 200, since no corrective action is required. However, if it is determined at step 205 that VDDOUT is not within range 1 then it is determined at step 210 whether VDDOUT is within range 2. If it is, then the charge pump settings are adjusted at step 215 by the controller 110 in combination with the charge pump settings control block 115 of FIG. 2. Thereafter the process returns to step 200. If it is determined at step 210 that VDDOUT is not within range 2, then this indicates a failure condition, and the system is notified at step 220 (this may involve issuing an abort signal to terminate operation of the charge pump).

Considering the right hand side of FIG. 4A, at step 225, it is determined whether VDDOUT is within range 3, and if so the slowosc signal is de-asserted at step 230, whereafter the process returns to step 200.

If it is determined at step 225 that VDDOUT is not within range 3, then at step 235 it is determined whether the slowosc signal is de-asserted. If it is not, this just indicates the normal situation where the slowosc signal is asserted, and the voltage is varying within normal bounds that have not required the slowosc signal to be de-asserted. However, if the slowosc signal is de-asserted, then this indicates that the voltage had strayed into range 3, has caused the slowosc signal to be de-asserted, and the voltage has now dropped out of range 3.

Accordingly, if it is determined that the slowosc signal is de-asserted at step 235, then it is determined at step 240 whether VDDOUT has been outside range 3 for a predetermined period of time. In one embodiment this can be achieved by the control circuitry initiating a timer when it is first observed that the VDDOUT signal has dropped below range 3 following de-assertion of the slowosc signal. Assuming that VDDOUT has not been outside range 3 for that pre-determined time, then the process merely returns to step 200. However, if it is determined at step 240 that VDDOUT has been outside range 3 for the pre-determined time, then the slowosc signal is re-asserted at step 245. At this time the earlier mentioned timer would also be reset. Following step 245 the process returns to step 200.

Figure 5:
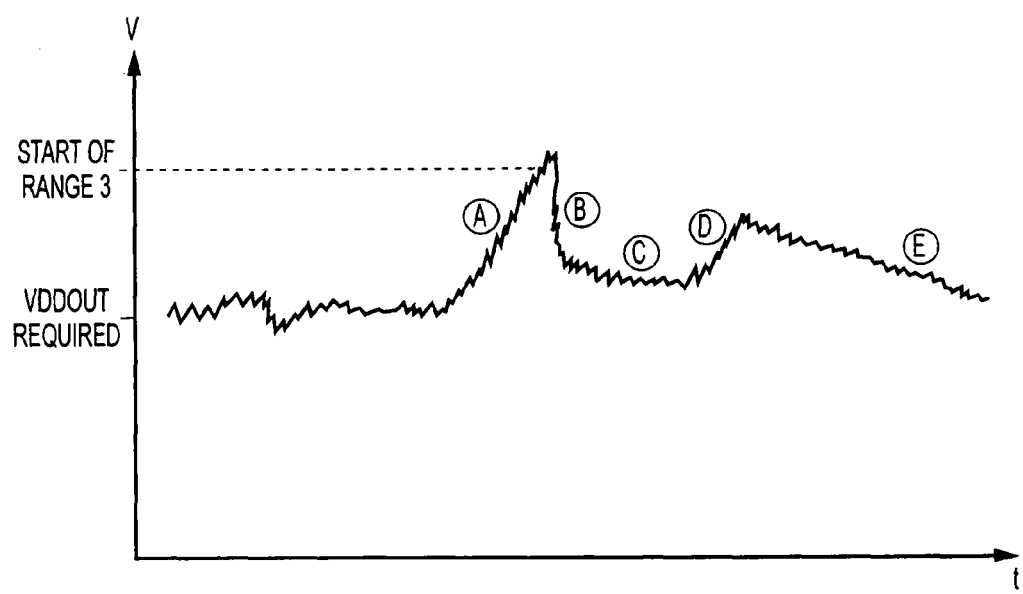
FIG. 5 is a graph schematically illustrating how the adjustments made when using the process of FIG. 4A may influence the output voltage from the charge pump circuitry in accordance with one embodiment.

FIG. 5 is a graph schematically illustrating the effects on the output voltage from the charge pump caused by the various adjustments that may me made by the control circuitry 35 in accordance with the above described embodiment. At point A on the graph there is a sudden rise in voltage due to a drop in load from the circuitry utilising the output from the charge pump. Once the control circuitry detects that this voltage has increased to within range 3, it de-asserts the slowosc signal, causing an increase in load on the output node of the charge pump due to the operation of the oscillator circuitry 15, and hence causing a quick reduction in voltage at point B on the graph. During period C, the control circuitry 35 makes one or more adjustments to the charge pump settings (for example by reducing the clock) with the aim of further reducing the output voltage from the charge pump towards the desired level. At point D, it is determined that the output voltage has been below range 3 for a predetermined period of time, and accordingly the slowosc signal is reasserted, causing an increase in voltage at the output of the charge pump, due to the associated reduction in load. However, at this point the voltage remains below the start of range 3 and accordingly during period E the control circuitry continues to make adjustments to the charge pump settings whilst the output voltage is within range 2, causing the voltage to slowly decrease towards the desired level.

Figure 6:
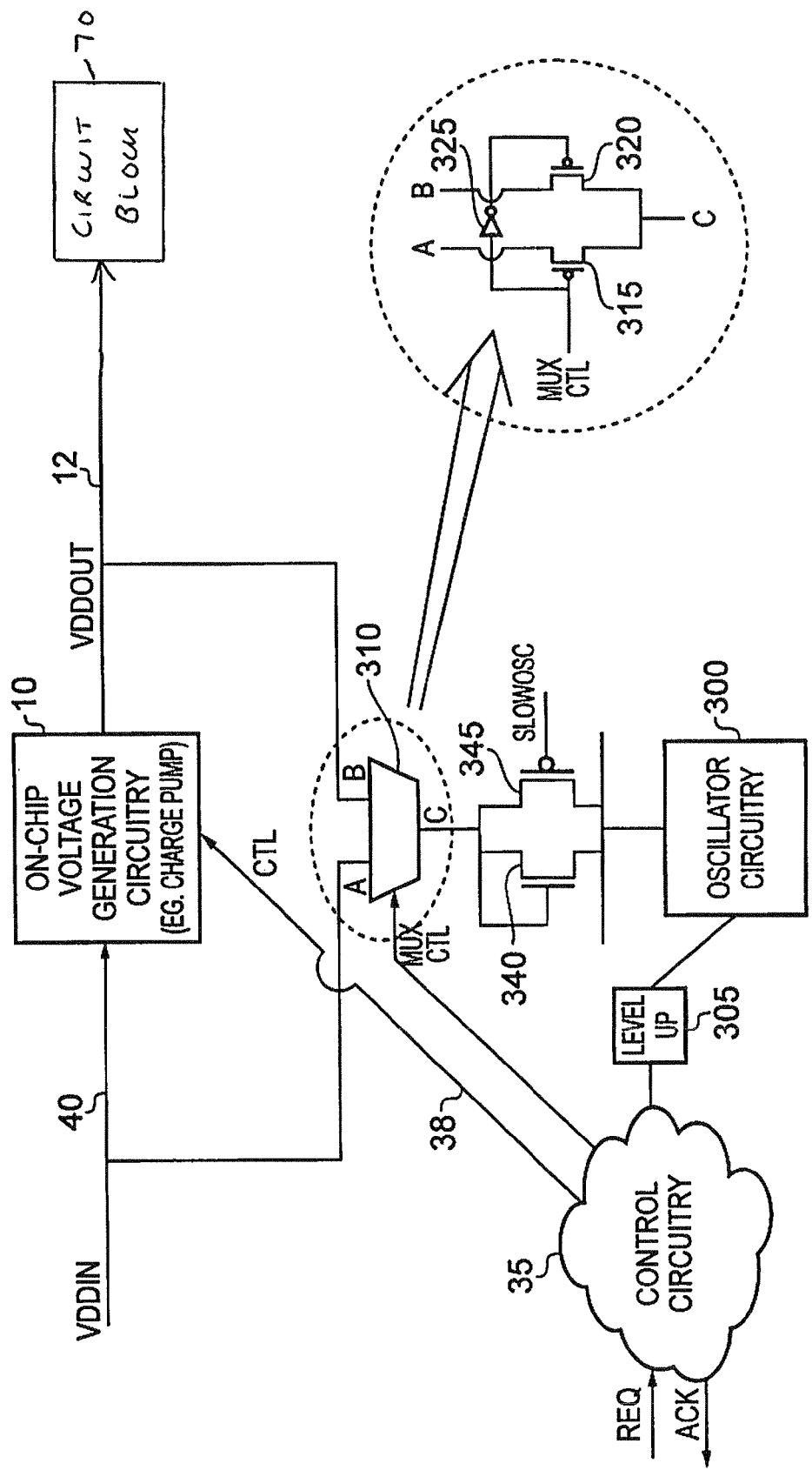
FIG. 6 is a block diagram of an apparatus in accordance with an alternative embodiment.

FIG. 6 illustrates an apparatus of an alternative embodiment, where the two oscillator circuits 15, 45 and associated coupling circuitry 20, 25 and 50, 55 of FIG. 1 are replaced by a single oscillator circuit 300 and associated coupling circuitry 340, 345 which are selectively connected to the VDDIN input path 40 or VDDOUT output path 12 by a multiplexer circuit 310 under the control of the control circuitry 35. As with the FIG. 1 embodiment, the oscillator circuitry 300 is connected via level up circuitry 305 to the control circuitry 35 and the control circuitry 35 continues to provide control signals over path 38 to the charge pump 10, and asserts and de-asserts the slowosc signal in the manner described with reference to the earlier embodiment. However, in addition, the control circuitry 35 issues a mux control signal to the multiplexer 310 so that the oscillator circuitry 300 is alternately connected to the VDDIN input path 40 and VDDOUT output path 12. Since at any point in time the control circuitry will only receive a single oscillation signal, only a single counter is required within the charge pump control circuitry 35, and the comparison circuitry 105 then temporarily buffers a first count signal obtained from the oscillation signal whilst the oscillator circuitry 300 is connected to one of the coupling circuits, so that it can subsequently be compared with the equivalent oscillation signal output by the oscillator circuitry 300 when it is connected to the other coupling circuit.

Whilst the approach of FIG. 6 gives a lower bandwidth for the monitoring operation, it removes any local variation effects that may exist between the two oscillator circuits 15, 45 of FIG. 1. In addition, it saves some power and area when compared with the approach of FIG. 1, due to the need to only provide a single oscillator circuit, and only a single counter within the charge pump control circuitry 35.

The multiplexer 310 can be formed in a variety of ways, but one illustrative arrangement is shown in FIG. 6, consisting of two PMOS transistors 315, 320 which each receive at their gate a signal which is the inverse of the signal received at the gate of the other PMOS transistor (due to the presence of the invertor 325). The mux control signal can then be a single bit value output by the control circuitry 35, and will ensure that any point in time the oscillator circuit is connected to one of the coupling circuits 20, 25 or 50, 55.

Figure 7:
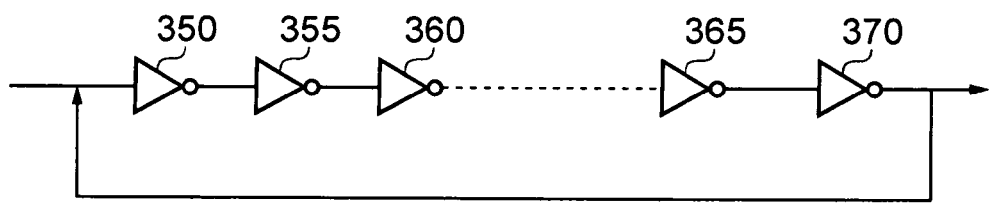
FIG. 7 is a diagram schematically illustrating the oscillator circuitry in accordance with one embodiment.

The oscillator circuits of FIG. 1 or FIG. 6 can take a variety of forms. In one embodiment, they are formed as a ring oscillator, and hence take the form illustrated in FIG. 7. In particular, an odd number of inverters 350, 355, 360, 365, 370 are provided in series, with the output from the final inverter being returned as an input to the first inverter. This will cause an oscillating signal to be output whose frequency is dependent on the supply voltage for the oscillator circuitry. For the reasons discussed earlier, due to the way in which the coupling circuits create the supply voltage, any variations in the voltage on the associated input path 40 or the associated output path 12 of the charge pump will cause corresponding variations in the supply voltage for the associated oscillator circuitry, and hence will cause variations in the frequency of the oscillation signal. Whilst it is expected that the supplied input voltage on path 40 will be relatively stable, as discussed earlier the output voltage from the charge pump may vary dependent on the load of the circuitry connected to the charge pump.

Whilst in one embodiment a ring oscillator is used, it will be appreciated that other forms of oscillator circuitry could be used, for example a current-starved oscillator design might provide a suitable option, although such a design would be more complex due to the need to provide an analogue bias voltage.

Figure 8:
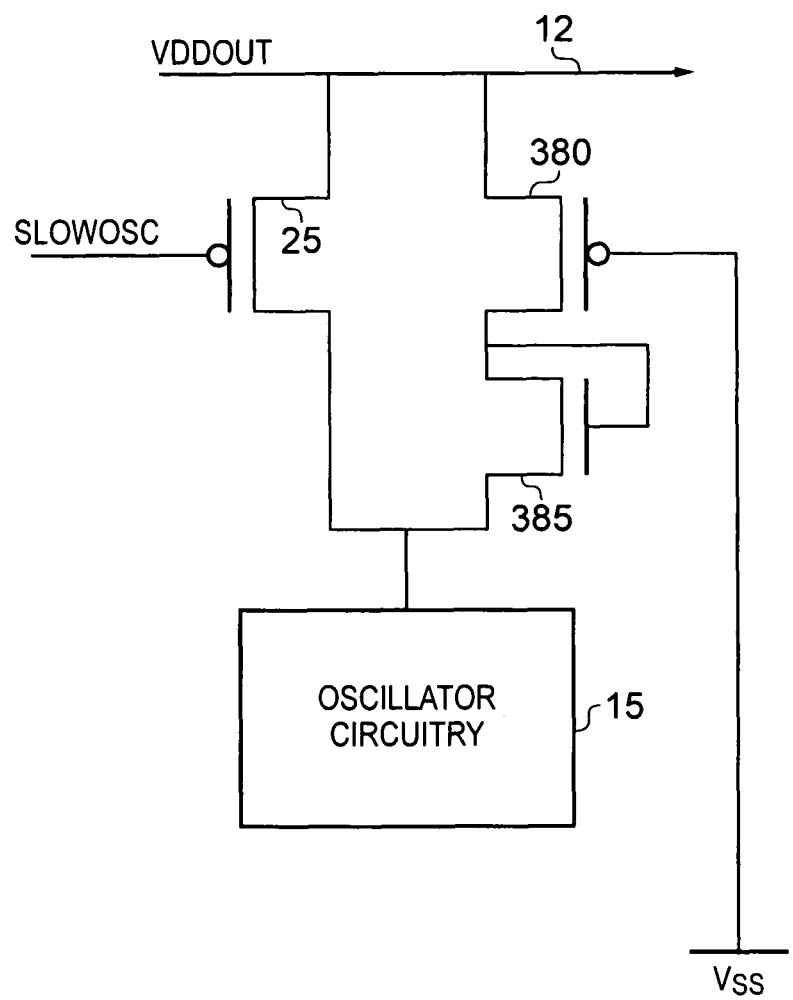
FIG. 8 is a diagram illustrating an arrangement of coupling transistors that may be used in an alternative embodiment in place of the coupling transistors illustrated in FIGS. 1 and 6.

In the embodiments shown in FIGS. 1 and 6, the gates of the NMOS transistors 20, 55 are tied directly to the power supply line. However, such an arrangement is not required and hence, if for example there is an electrostatic discharge (ESD)/reliability concern, an alternative arrangement such as shown in FIG. 8 could be used. The arrangement shown in FIG. 8 is a replacement for the coupling circuitry shown on the right hand side of FIG. 1, but an equivalent arrangement could be used for the other coupling circuit formed from the transistors, 50, 55. As shown, the PMOS transistor 25 is unchanged, and receives at its gate the slowosc signal. However, the NMOS transistor 20 is replaced by a PMOS transistor 380 and an NMOS transistor 385 in series. The PMOS transistor 380 is permanently turned on by having its gate connected to ground, and accordingly it will be appreciated that this arrangement provides an equivalent functionality to that shown for the coupling circuits of FIG. 1 or FIG. 6, but without the requirement to directly connect the gate or drain of the NMOS transistor to the supply line.

Figure 9:
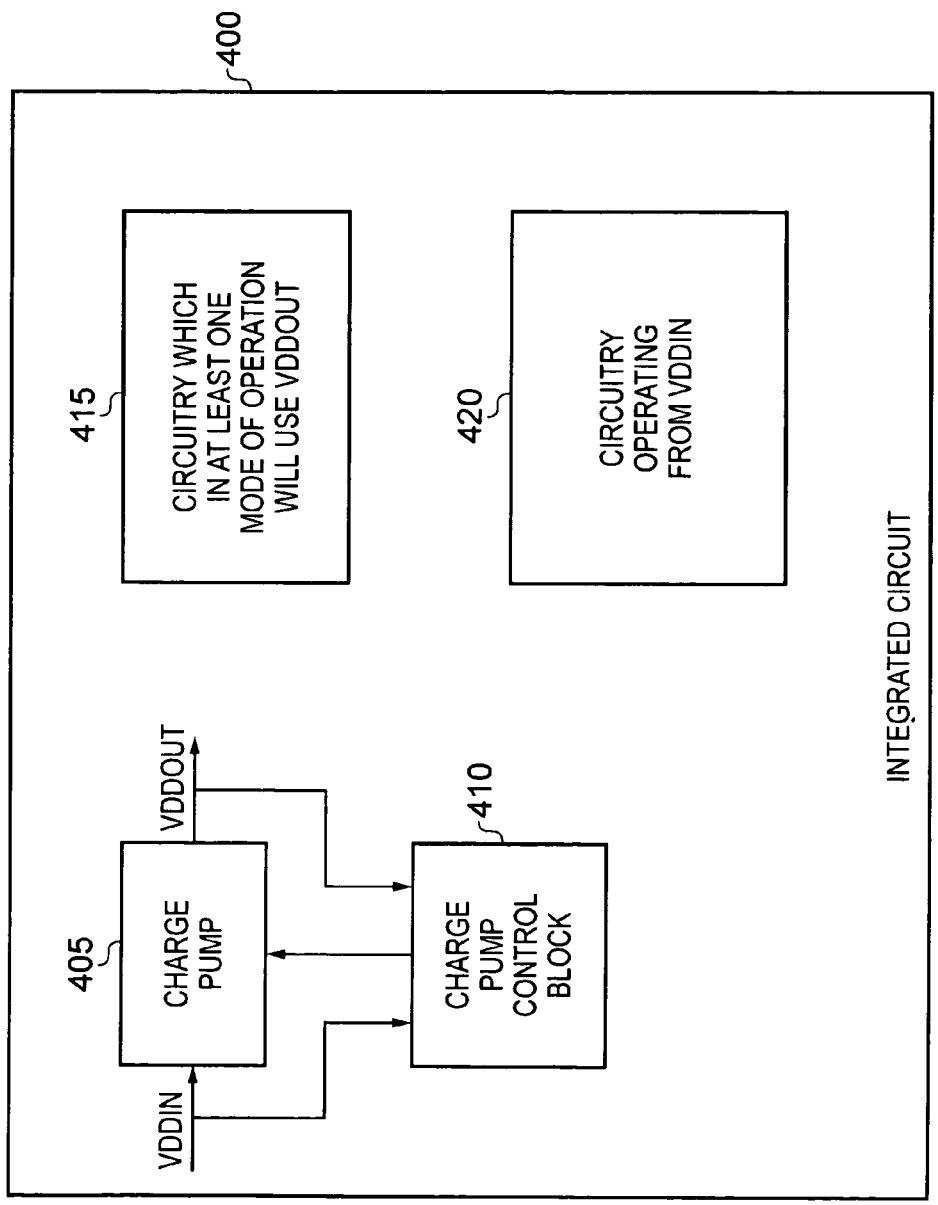
FIG. 9 is a diagram schematically illustrating an integrated circuit incorporating the apparatus of the earlier described embodiments.

FIG. 9 illustrates an integrated circuit 400 in which the apparatus of the above described embodiments may be incorporated. In particular, in the integrated circuit 400 there is some circuitry which will always operate from the supplied input voltage VDDIN, such circuitry being denoted by the box 420. However, in addition there is some circuitry 415 which in at least in one mode of operation will use the output voltage VDD OUT from the charge pump 405, and hence will require the charge pump 405 to be turned on. The charge pump control block 410 schematically illustrated in FIG. 9 will include the coupling circuits, oscillator circuits and control circuitry discussed in relation to the earlier described embodiments.

The charge pump 10 can take a variety of forms. However, in one embodiment, the charge pump has the novel arrangement discussed in more detail below with reference to FIGS. 10 to 14, providing a complete on-chip implementation of a programmable charge pump circuit using novel schemes to realise a simple architecture. The design involves the use of multiple charge pump blocks, where each charge pump block takes the form shown in FIG. 10. A first plurality of transistors 455, 460, 465 and 470 are arranged in series between the output node 475 and the input node 450 providing the supply voltage VDDIN. A second plurality of transistors 480, 485 are then arranged in series between the input node 450 and a reference voltage 490, in this example the reference voltage being at ground potential. A capacitor element 495 is connected between the two series of transistors, and in particular is connected to a first intermediate node 497 in the first plurality of transistors and a second intermediate node 499 in the second plurality of transistors.

The capacitor 495 is charged to the VDDIN supply voltage through transistors 455, 460 and 485 during one phase of a clock signal (this will be referred to as the charging phase of operation) and then in the alternate phase of the clock signal the capacitor 495 re-references the charged potential to the supply potential (instead of ground) through the transistor 480, and then discharges that voltage to the VDDOUT node 475 through the transistors 465 and 470 (this phase being referred to as the discharging phase). Hence, whilst the transistors 455, 460 and 485 form the charging transistors, the transistors 480, 465 and 470 form the discharging transistors. Since the transistor 480 is an NMOS transistor, it only re-references the node 499 of the capacitor 495 to the supply voltage minus the threshold voltage of that transistor, and that node is hence lower than the supply potential. This allows a safety margin to use regular threshold transistors throughout the design, which saves area and power as the charging and discharging transistors can then be of comparatively smaller size.

Furthermore, in a conventional design, a level shifter would be necessary to drive the gates of any transistors used to discharge the node 497 of the capacitor 495 to the output node 475, so as to ensure that those transistors could be completely turned off since such transistors now face a potential higher than the supply potential. However, in accordance with the current design illustrated in FIG. 10 such a necessity is obviated due to the way in which the transistors are stacked (back gate effect) and the use of small size transistors for the transistors 465, 470.

Typical prior art charge pump designs use complex non-overlapping clock generators to remove potential shorting paths between the input supply and ground. Such a complex clock generator design is shown for example in FIG. 7 of the earlier mentioned article "Efficiency Improvements In Charge Pump Circuits" by Wang and Wuo, IEEE Journal of Solid-State Circuits, Volume 32, No. 6, June 1997. However, in accordance with the current design shown in FIG. 10 of the present application, the first plurality of transistors 455, 460, 465, 470 are all PMOS transistors and the second plurality of transistors 480, 485 are both NMOS transistors. Considering the potential shorting path between the input supply 450 and the ground supply 490, since the transistor 480 is in this design an NMOS transistor, the short circuit potential is limited by one threshold voltage drop across the transistor 480, and the current is limited by the use of comparatively small device sizes for transistors 480 and 485. This weak short-circuit reduces the efficiency slightly but enables an improved design. In particular, improved regulation and a reduction in output ripple are achieved as a result of being able to connect two of the charge pump blocks of FIG. 10 in parallel as shown in FIG. 11A to form a charge pump unit where the output node 530 of that unit is continually pumped with the charge stored in the capacitor 495. Hence, in the design shown in FIG. 11A, both of the charge pump blocks 500, 510 take the form shown in FIG. 10, but they have their clock inputs reversed, so that whilst one of the charge pump blocks is in the charging phase of operation, the other charge pump block is in the discharging phase of operation.

In the conventional design of charge pump such as that discussed in the above-mentioned article by Wang and Wu, this form of parallel connection would be very inefficient in terms of area and power since there would be a need for two non-overlapping clock generators, one with a non-overlapping high phase and another with a non-overlapping low phase. However, in the proposed design such a charge pump unit formed of two charge pump blocks can be formed from a simple parallel connection as shown in FIG. 11A, with those blocks both being connected to complementary phases of the clock. In particular, FIG. 11B shows the complementary phases (CP) 1 and 2 of the clock signal that can be provided over paths 515 and 520.

As also shown in FIG. 11A, a voltage control (VC) path 525 is provided carrying an enable input to the charge pump blocks of the charge pump unit shown in FIG. 11A. This enables the charge pump unit to be selectively turned on and off, and when the relevant voltage control bit is set high to provide a set enable signal to both of the blocks 500, 510, the value of the signal ENB will go low, hence turning on the transistors 460, 465. However, when the enable signal is low, it will be seen that the signal ENB will be at a high level, hence turning off the transistors 460, 465, and thereby disabling the operation of the associated charge pump block. In one embodiment, both of the blocks 500, 510 in any particular charge pump unit operate from the same enable signal.

Figure 12:
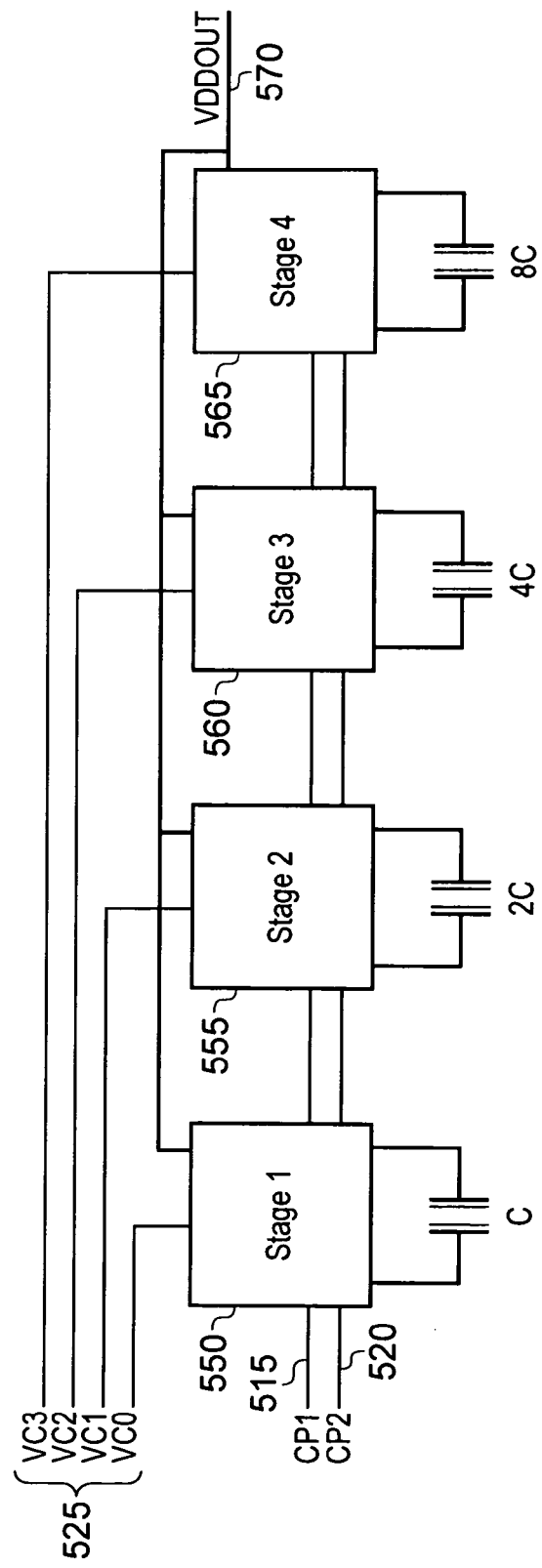
FIG. 12 is a charge pump circuit formed as a plurality of charge pump units, where each charge pump unit takes the form illustrated in FIG. 11A.

By the use of such an enable signal, a charge pump circuit can be developed which includes a plurality of the charge pump units shown in FIG. 11A, and with each of those units being selectively turned on or off dependent on a pattern of voltage control bits. Such a design is shown in FIG. 12. Accordingly, each of the stages 550, 555, 560, 565 is formed from a charge pump unit as shown in FIG. 11A, each with its own associated capacitance. Whist the capacitance of each stage could be the same, as shown in FIG. 12 the capacitance of each stage may be set differently, through appropriate sizing of the capacitor 495 used within the pair of charge pump blocks forming each charge pump unit. All of the stages receive the same complementary phases CP1 and CP2 of the clock signal over paths 515, 520. The voltage control signal is a multi-bit signal 525, with each bit being used as an enable signal for one of the stages.

When such an arrangement is used to form the charge pump of the earlier described embodiments of FIGS. 1 and 6, it will be seen that the control circuitry can hence alter the drive strength of the charge pump by issuing appropriate control signals over path 38. As a result, within the integrated circuit the charge pump can be digitally programmed to higher or lower boost voltages depending on the loading of the output node of the charge pump as monitored by the control circuitry. Additionally, these programmable VC bits allow field programmability to compensate for effects such a process skews, temperature and voltage variations, etc. The output of the charge pump is shown in FIG. 12 by the path 570, which in turn will provide the output over path 12 shown in FIG. 1 or 6.

From the above description of FIGS. 10 to 12, it will be seen that the described charge pump circuitry provides a number of benefits:

1. The approach of stacking PMOS transistors avoids the use of bulky level shifters to turn off the transistors 465 and 470.
2. The use of an NMOS transistor for the transistor 480 limits discharging potential of the capacitor 495 to safe values.
3. The use of an NMOS transistor for the transistor 480 limits short circuitry current and avoids the use of complex non-overlapping clock generation.
4. The transistors 455, 460, 465, 470, 480 and 485 are narrow transistors compared to a conventional implementation, so that a balance is achieved between short circuit and resistive switching power loss.
5. Because of items 1 and 2 above, nominal threshold voltage devices can be used simplifying implementation of the scheme.
6. Using parallel charge pump blocks to form each charge pump unit, as shown in FIG. 11A, and operating them from alternate halves of the clock signal, reduce output ripple and improve regulation.
7. Using PMOS transistors within a stack of transistors to turn on or off individual charge pump blocks when using the arrangement of FIG. 12 allows programmability with regards to the required voltage boost observed at the output node 570.
8. The design trades off some of the efficiency (resistive switching loss) by using narrow transistors.

Figures 13, 14:
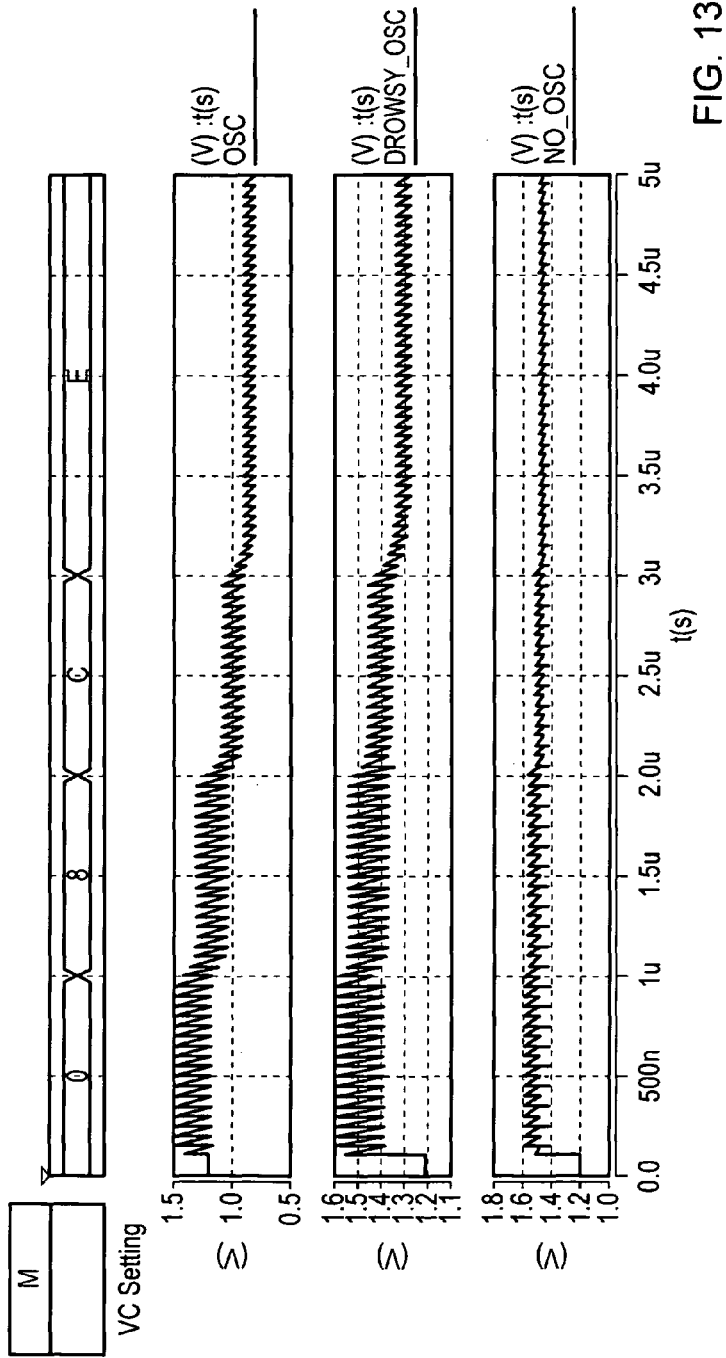
FIGS. 13 and 14 illustrate the control of the output voltage from the charge pump that is possible when incorporating the techniques of the described embodiments.

The benefits of using the above charge pump design within the apparatus of FIG. 1 or 6 will now be described with reference to FIGS. 13 and 14. FIG. 13 shows simulation results, and in particular shows the output of the charge pump for different voltage control (VC) bit settings. The top most pane shows the VC bit settings. The second pane from the top shows the output voltage achieved with a traditional ring oscillator load. The third pane shows the voltage achieved when using the coupling circuitry and oscillator circuitry of the described embodiments (also referred to herein as a drowsy oscillator due to its ability to operate in a slow oscillation mode), and the bottom most pane shows the results when no oscillator at all is used.

As can be seen from the second pane, when using a traditional oscillator that oscillator overloads the charge pump. In particular, it can be seen that the voltage drops below VDD (in this example 1 volt) for some VC settings, which makes the charge pump design unusable. In addition, the ripple is too large.

Looking at the bottom most pane, when no oscillator is used there is insignificant variation in the voltage for the different VC settings. However, when using the above described charge pump design with the drowsy oscillator approach of the described embodiments, this gives a variety of usable output voltages for the charge pump, all of which are above VDD. The average voltages measured (after the output from the charge pump has settled at its new value) for each VC setting is listed in the table of FIG. 14.

In summary, it can be seen that the above described charge pump design, when combined with the drowsy oscillator approach described earlier, allows the boosted voltage to be realised using a power and area efficient circuit, whilst including programmability for regulating the boost voltage.

Figure 15:
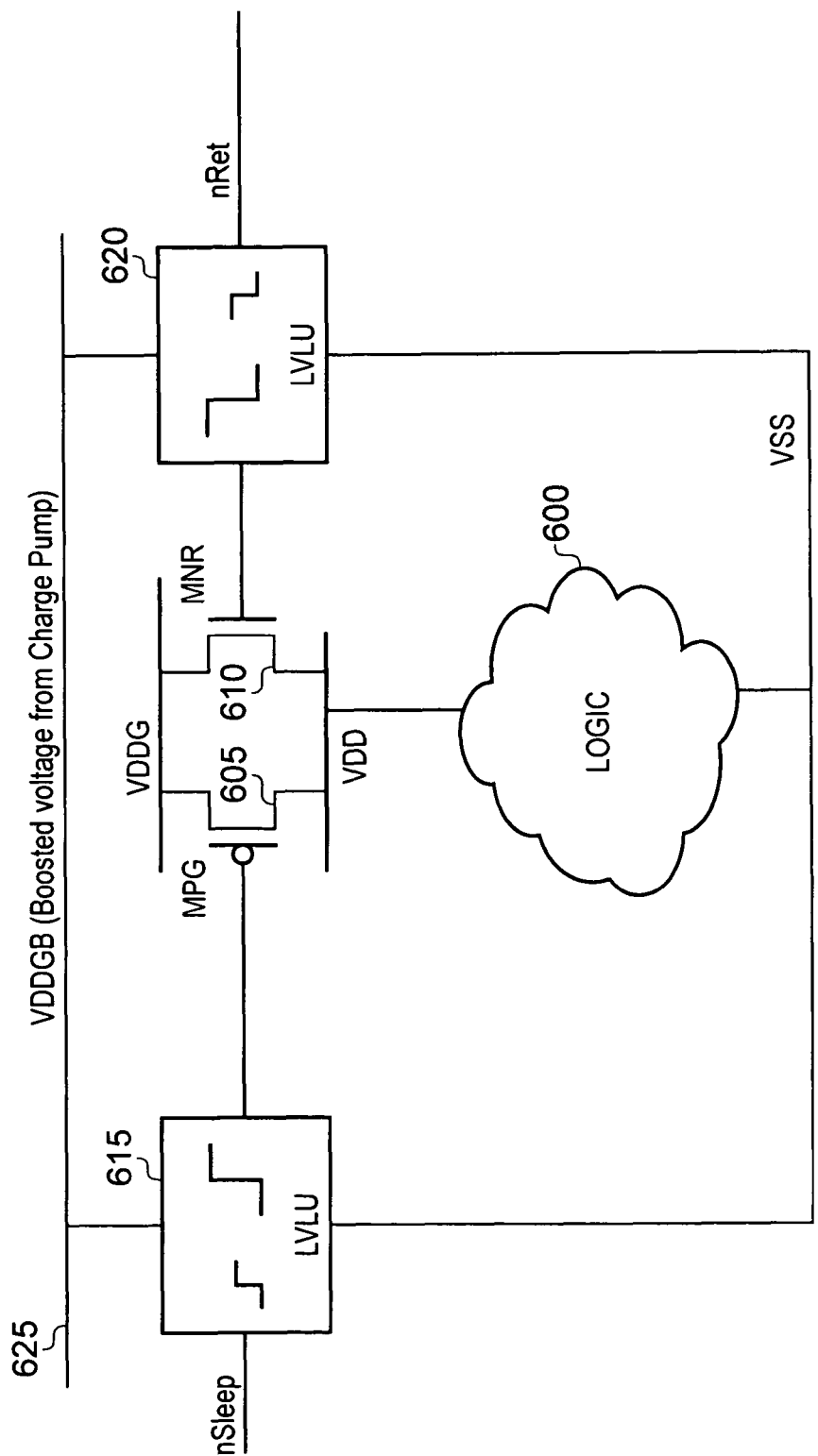
FIG. 15 is a block diagram schematically illustrating an example of circuitry that may use the boosted voltage produced by the charge pump of the above described embodiments in order to implement a super-cut-off scheme for reducing leakage current.

The circuits that may be connected to the output from the charge pump can take a variety of forms. Typically, the current sourced from the charge pump is small especially for complete on-chip implementations. In one embodiment, the charge pump output is used to provide a boosted voltage that can overdrive gates of PMOS header circuits, in order to provide so called super cut-off header circuits, which can lower the leakage current through the PMOS headers when they are turned off. FIG. 15 illustrates the scheme of using super cut-off headers for reducing leakage current. The logic circuits 600 are selectively connected to a voltage supply by a PMOS header switch 605, and an NMOS state retention switch 610. However, typically CMOS logic suffers from leakage current if the gates of these switches 605, 610 are driven at nominal VDD levels when switching them off. In accordance with a super cut-off scheme a boosted version of VDD, for example generated by a charge pump and output over path 625, is used, this voltage often being referred to as a gate bias VDD (VDDGB).

As shown in FIG. 15, the original sleep and retention signals are boosted by the level shifting blocks 615, 620 in accordance with the boosted voltage from the charge pump over paths 625, with the boosted signals then being provided to the gates of the switches 605, 610.

Figure 16:
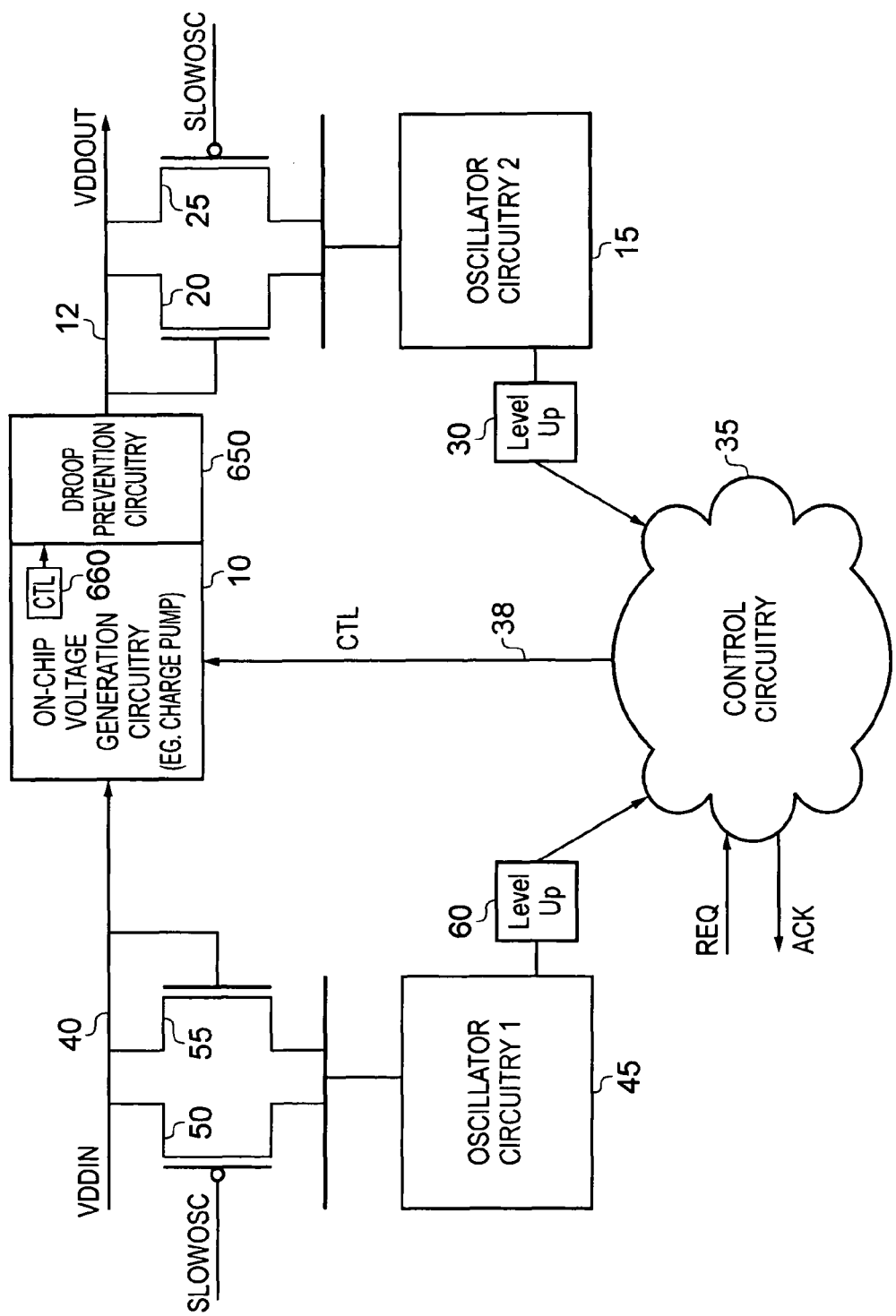
FIG. 16 illustrates an alternative apparatus to the apparatus of FIG. 1, which incorporates droop prevention circuitry.

On-chip charge pumps using on-chip capacitors typically provide low load currents of the order of tens of micro amperes, and are susceptible to droops in the voltage for intermittent load currents. However, applications such as the power gating application discussed with reference to FIG. 15 are sensitive to any voltage collapse, and this can give rise to issues when using on-chip charge pumps to generate the boosted voltage required. FIG. 16 describes a modification that can be made to the earlier described embodiment of FIG. 1 in order to mitigate against a droop in the output voltage from the charge pump, so as to alleviate the above-mentioned problems when using such an on-chip charge pump to provide a boosted voltage supply to power gating circuitry. In particular, as shown, droop prevention circuitry 650 is connected to an output interface of the charge pump 10, and is used to couple that output interface with the output node providing the charge pump output voltage on path 12. A control element 660 within the charge pump is responsive to the asserted request signal causing the charge pump to be turned on to control components within the droop prevention circuitry. More details of the droop prevention circuitry in accordance with one embodiment are illustrated in FIG. 17.

Figure 17:
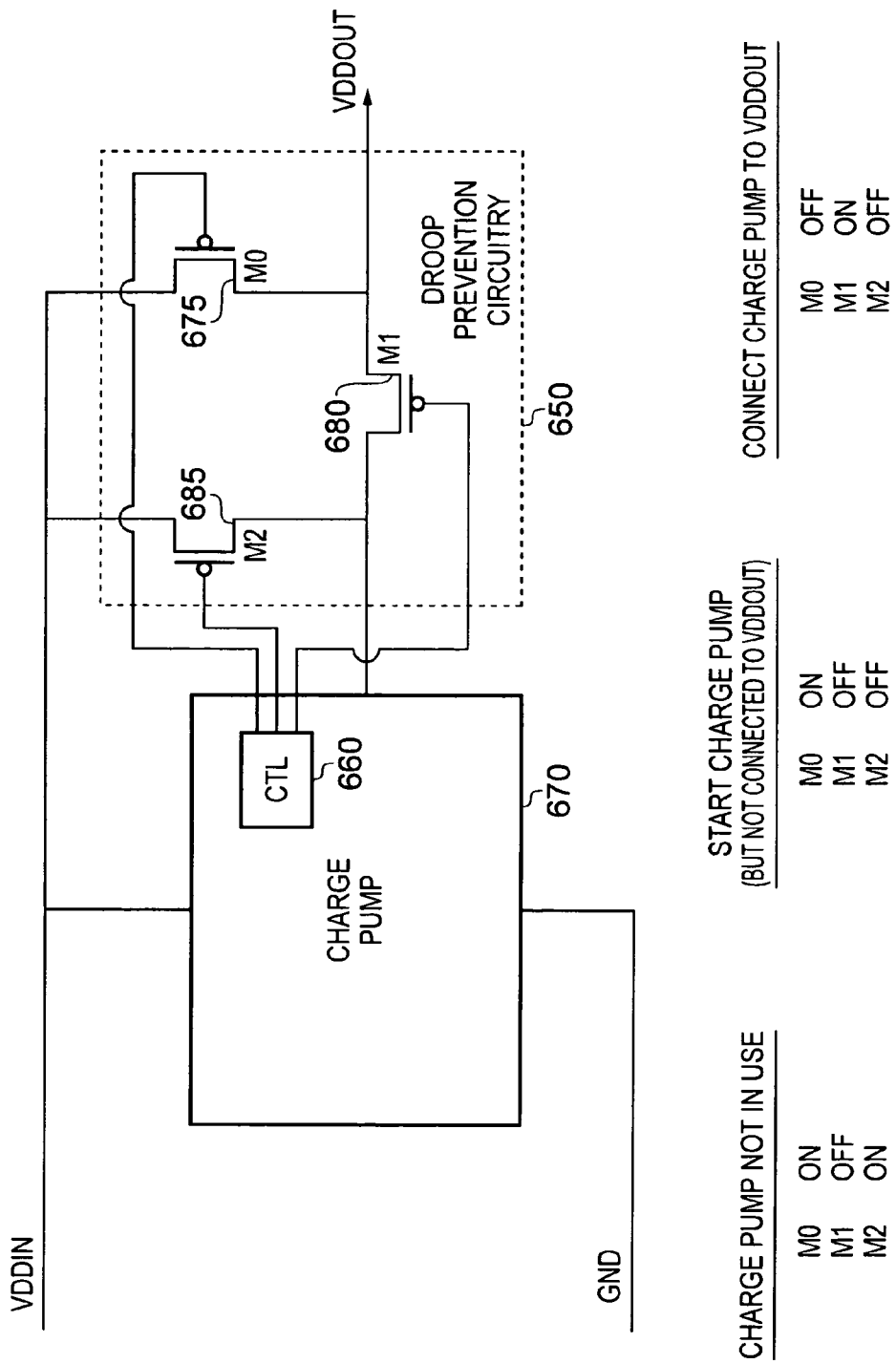
FIG. 17 is a diagram illustrating in more detail components provided within the droop prevention circuitry of FIG. 16.

As shown in FIG. 17, a first PMOS transistor 675 is used to selectively connect the input supply voltage to the output node providing the VDDOUT voltage. Further, a second transistor 680 (which is also a PMOS transistor in the described embodiment) is used to selectively connect and disconnect the output interface of the charge pump with the output node providing the VDDOUT voltage. Finally, a third PMOS transistor 685 is used to selectively connect the output interface of the charge pump to the supplied input voltage.

As shown in the lower part of the figure, the way in which the control block 660 controls these various switches is dependent on whether the charge pump is being used or not. When the charge pump is not in use, the transistor 680 is turned off so as to disconnect the output interface of the charge pump from the output node providing the VDDOUT voltage. However, both of the transistors 675 and 685 are turned on, so that the output interface is pre-charged to the VDDIN level, and the VDDOUT voltage is connected to the VDDIN level.

During a start-up mode of operation, just after the charge pump has been turned on, the transistor 685 is turned off, disconnecting the output interface from the supplied input voltage. During this mode of operation, the charge pump accordingly begins to generate a boosted output voltage at its output interface, with that voltage increasing until the desired boosted voltage is reached and that voltage is steady. However, during this start-up stage the transistor 680 remains turned off, so that the output interface of the charge pump is disconnected from the VDDOUT voltage. Instead, the VDDOUT voltage continues to be at the voltage level of the VDDIN supply due to the transistor 675 remaining turned on.

Once the output from the charge pump has reached a steady state at the desired boosted output voltage level, then the transistor 675 is turned off to decouple the VDDOUT path from the supply voltage VDDIN, and the transistor 680 is turned on to couple the output interface of the charge pump to the VDDOUT path. Accordingly, at this point the voltage as observed at the VDDOUT path will increase from the VDDIN supply level up to the boosted voltage level. However, since the charge pump had been allowed to reach the steady state boosted output voltage before being coupled to the VDDOUT line, the droop in voltage that might otherwise arise from the load on the VDDOUT line during the start-up stage of the charge pump is avoided.

Figure 18A:
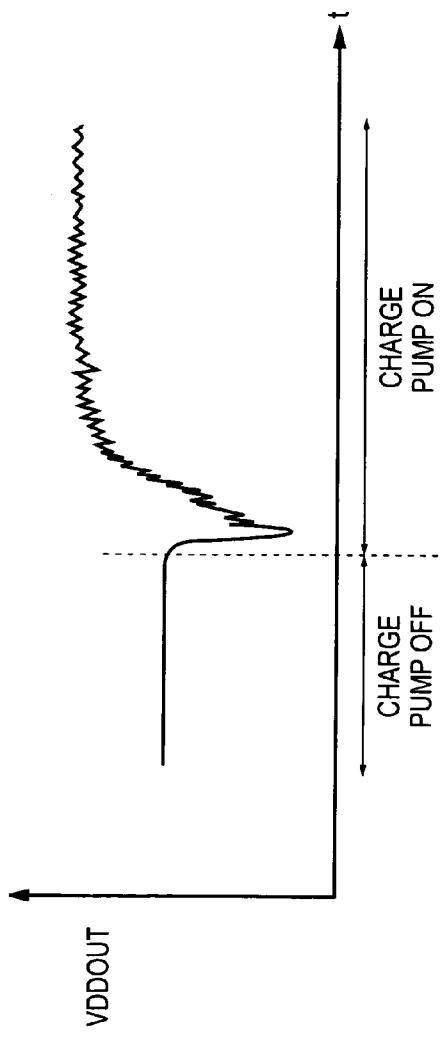
FIGS. 18A and 18B are graphs schematically illustrating the output voltage from the charge pump both without the droop prevention circuitry of FIG. 16 and with the droop prevention circuitry of FIG. 16.
Figure 18B:
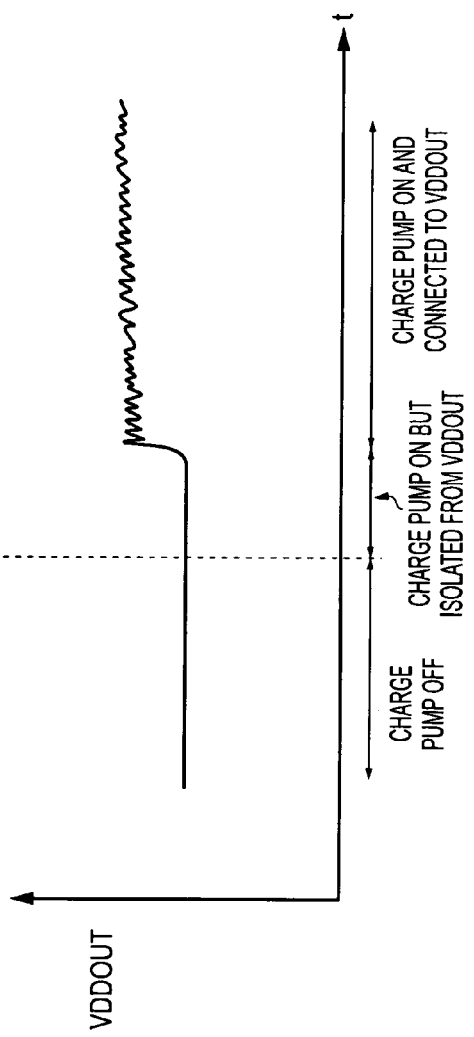

This is illustrated by a comparison of FIGS. 18A and 18B. FIG. 18A schematically illustrates the voltage at the output node of the charge pump when droop prevention circuitry is not used. As can be seen, as soon as the charge pump is turned on, the loading present due to the circuitry connected to the VDDOUT path can cause a droop in the voltage before that voltage increases to the desired boosted output level. However, as shown in FIG. 18B, when the droop prevention circuitry is used, then during an initial phase of operation of the charge pump, the transistor 680 decouples the loading on the VDDOUT path from the output interface of the charge pump and the transistor 675 ensures that during that period the VDDOUT voltage remains at the VDDIN supply level. Only once a steady state with regard to the charge pump boosted output is reached is the VDDOUT path switched from the VDDIN supply to the voltage actually being output by the charge pump, and accordingly at that time the voltage then rises up to the desired boosted output level without any observable droop in voltage.

Such an approach is particularly useful when the output from the charge pump is being used to control a series of header switches, as per the example embodiment of FIG. 15. In particular, when the boosted output voltage from the charge pump is required for power gating, there are likely to be several hundred PMOS header switches that must be driven by the charge pump. Such an instantaneous load can cause the voltage droop illustrated in FIG. 18A, and that can be catastrophic to the processor operation. In particular, during the first load-current demand, the bias voltage may drop in some instances below 400 mV exposing the rest of the logic to the risk of unintended turn-on, and also the loss of retention data which is critical for processor operation. However, by adopting the droop prevention circuitry of the above described embodiment, such a droop is avoided, hence ensuring correct operation.

From the above described embodiments, it will be seen that such embodiments allow a boosted on-chip voltage to be realised using a power and area efficient circuit that provides a mechanism for limiting, monitoring and controlling the charge pump voltage output level to compensate for changes in loading present on the output node of the charge pump. In one embodiment, a novel charge pump circuit is used enabling the drive strength of the charge pump to be altered during use, and hence to be tuned for minimum energy or more accurate output voltage. Further, when using the droop convention circuitry of the above described embodiments, this allows the boosted voltage to settle completely before placing the current demand on the output of the charge pump, thereby enabling the on-chip charge pump to be used reliably in power gating and body-bias applications.

Although particular embodiments have been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

We claim:

1. An integrated circuit comprising:
    voltage generation circuitry configured to operate from a supplied input voltage and to generate at an output node an on-chip voltage supply different to said supplied input voltage;
    a circuit block configured to receive the on-chip voltage supply generated by the voltage generation circuitry, during operation of the circuit block, the circuit block presenting a varying load on said output node;
    oscillation circuitry coupled to said output node to provide an additional load on said output node and configured to produce an oscillation signal whose frequency varies as the value of the on-chip voltage supply varies; and
    control circuitry configured to be responsive to a trigger condition to adjust the additional load provided on the output node by said oscillation circuitry, wherein:
    said control circuitry further comprises monitoring circuitry configured to monitor said oscillation signal in order to monitor variation in a value of the on-chip voltage supply generated by the voltage generation circuitry;
    said monitoring circuitry is configured to be responsive to at least one predetermined variation in said oscillation signal to indicate said trigger condition, and the control circuitry being responsive to said trigger condition to cause the power consumption of said oscillation circuitry to be varied in order to vary the amount of said additional load on said output node.

2. An integrated circuit as claimed in claim 1, wherein said at least one predetermined variation in the oscillation signal comprises a predetermined variation indicating that the value of the on-chip voltage supply has increased beyond a predetermined level, and the control circuitry is responsive to detection of said predetermined variation by the monitoring circuitry to cause the power consumption of said oscillation circuitry to be increased, thereby increasing the amount of said additional load on said output node.

3. An integrated circuit as claimed in claim 2, wherein:
    the monitoring circuitry is further configured, after causing the power consumption of said oscillator to be increased, to continue to monitor the oscillation signal, and the control circuitry is responsive to the monitoring circuitry determining from the oscillation signal that the value of the on-chip voltage supply has decreased below said predetermined level for a predetermined period of time, to cause the power consumption of said oscillation circuitry to be reduced, thereby reducing the amount of said additional load on said output node.

4. An integrated circuit as claimed in claim 1, wherein:
    said control circuitry further comprises coupling circuitry configured to couple the oscillation circuitry to said output node and to generate an operating voltage for the oscillation circuitry from the on-chip voltage supply; and
    the control circuitry is configured to be responsive to detection of said at least one predetermined variation by the monitoring circuitry to cause the coupling circuitry to vary the operating voltage for the oscillation circuitry in order to vary the amount of said additional load on said output node.

5. An integrated circuit as claimed in claim 4, wherein the coupling circuitry comprises a plurality of switch elements connected in parallel between the output node and a supply line providing the operating voltage for the oscillation circuitry, initially a chosen subset of said plurality of switch elements being turned on, but on detecting said at least one predetermined variation, the control circuitry altering which switch elements of said plurality are turned on in order to vary the resistance of the coupling circuitry.

6. An integrated circuit as claimed in claim 5, wherein each switch element comprises at least one transistor.

7. An integrated circuit as claimed in claim 1, wherein:
    the oscillation circuitry is alternately coupled to said output node and to an input node providing the supplied input voltage, when coupled to the input node the oscillation circuitry being configured to produce a reference oscillation signal indicative of the supplied input voltage;
    the monitoring circuitry includes comparison circuitry configured to compare the oscillation signal and the reference oscillation signal in order to produce a comparison output, and the monitoring circuitry is configured to monitor variation in said comparison output in order to detect said at least one predetermined variation.

8. An integrated circuit as claimed in claim 1, further comprising:
    reference oscillation circuitry coupled to an input node providing the supplied input voltage and configured to produce a reference oscillation signal indicative of the supplied input voltage;
    the monitoring circuitry including comparison circuitry configured to compare the oscillation signal and the reference oscillation signal in order to produce a comparison output, and the monitoring circuitry being configured to monitor variation in said comparison output in order to detect said at least one predetermined variation.

9. An integrated circuit as claimed in claim 8, wherein:
    said control circuitry further comprises first coupling circuitry configured to couple the oscillation circuitry to said output node and to generate an operating voltage for the oscillation circuitry from the on-chip voltage supply, and second coupling circuitry configured to couple the reference oscillation circuitry to said input node and to generate an operating voltage for the reference oscillation circuitry from the supplied input voltage; and
    the control circuitry is configured to be responsive to detection of said at least one predetermined variation by the monitoring circuitry, to cause the first coupling circuitry and second coupling circuitry to alter the operating voltage for both the oscillation circuitry and the reference oscillation circuitry.

10. An integrated circuit as claimed in claim 1, wherein said voltage generation circuitry comprises charge pump circuitry which is configured to generate the on-chip voltage supply in a manner which results in the value of that on-chip voltage supply increasing as the load on the output node decreases.

11. An integrated circuit as claimed in claim 1, wherein said oscillator circuitry is a ring oscillator.

12. An integrated circuit as claimed in claim 1, wherein said on-chip voltage supply is greater than supplied input voltage.

13. An integrated circuit comprising:
voltage generation circuitry configured to operate from a supplied input voltage and to generate at an output node an on-chip voltage supply different to said supplied input voltage;
a circuit block configured to receive the on-chip voltage supply generated by the voltage generation circuitry, during operation of the circuit block, the circuit block presenting a varying load on said output node;
oscillation circuitry coupled to said output node to provide an additional load on said output node and configured to produce an oscillation signal whose frequency varies as the value of the on-chip voltage supply varies; and
control circuitry configured to be responsive to a trigger condition to adjust the additional load provided on the output node by said oscillation circuitry, wherein the control circuitry is configured to monitor the variation in value of said oscillation signal relative to an initial value of said oscillation signal that is indicative of a desired value for said on-chip voltage supply, and to adjust one or more settings of the voltage generation circuitry if said variation exceeds a threshold amount with the aim of reducing said variation back below said threshold amount.

14. An integrated circuit as claimed in claim 13, wherein:
said voltage generation circuitry comprises charge pump circuitry formed as a plurality of charge pump units, each of which is enabled by an associated enable signal, the charge pump circuitry being operable in a plurality of modes of operation, each mode of operation being selected by an associated pattern of values of the enable signals such that the charge pump units used, and hence a drive strength of the charge pump circuitry, varies dependent on the mode of operation; and
the one or more settings adjusted by the control circuitry comprises at least the values of the enable signals associated with the charge pump units of said plurality.

15. An integrated circuit as claimed in claim 14, wherein each charge pump unit comprises at least one charge pump block, each charge pump block comprising:
a first plurality of transistors arranged in series between said output node and an input node providing the supplied input voltage, and providing a first intermediate node;
a second plurality of transistors arranged in series between said input node and a reference voltage, and providing a second intermediate node;
a capacitor element connected between said first intermediate node and said second intermediate node;
during a charging phase of operation at least one transistor in said first plurality and at least one transistor in said second plurality being activated to operate as charging transistors coupling the capacitor between said input node and said reference voltage; and
during a discharging phase of operation at least one other transistor in said first plurality and at least one other transistor in said second plurality being activated to operate as discharging transistors coupling the capacitor between said input node and said output node.

16. An integrated circuit as claimed in claim 15, wherein:
the transistors in said second plurality are of a same type;
said at least one transistor in said second plurality is activated during the charging phase by a first phase of a clock signal; and
said at least one other transistor in said second plurality is activated during the discharging phase by a second phase of said clock signal, said first and second phases being complementary phase.

17. An integrated circuit as claimed in claim 16, wherein the transistors in said second plurality are NMOS transistors.

18. An integrated circuit as claimed in claim 15, wherein at least one of said first plurality of transistors and said second plurality of transistors include enable transistors activated by the enable signal associated with the charge pump unit.

19. An integrated circuit as claimed in claim 18, wherein:
said first plurality of transistors includes said enable transistors;
during the charging phase, multiple transistors from said first plurality, including a first enable transistor, are used in a stacked arrangement to form the charging transistors from said first plurality; and
during the discharging phase, multiple transistors from said first plurality, including a second enable transistor, are used in a stacked arrangement to form the discharging transistors from said first plurality.

20. An integrated circuit as claimed in claim 19, wherein the transistors in said first plurality are PMOS transistors.

21. An integrated circuit as claimed in claim 15, wherein each charge pump unit comprises first and second charge pump blocks arranged in parallel with respect to said output node, the first charge pump block being configured to be in said charging phase during a first half of a clock cycle, and the second charge pump block being configured to be in said charging phase during a second half of said clock cycle.

22. An integrated circuit comprising:
voltage generation circuitry configured to operate from a supplied input voltage and to generate at an output node an on-chip voltage supply different to said supplied input voltage;
a circuit block configured to receive the on-chip voltage supply generated by the voltage generation circuitry, during operation of the circuit block, the circuit block presenting a varying load on said output node;
oscillation circuitry coupled to said output node to provide an additional load on said output node and configured to produce an oscillation signal whose frequency varies as the value of the on-chip voltage supply varies; and
control circuitry configured to be responsive to a trigger condition to adjust the additional load provided on the output node by said oscillation circuitry, wherein:
the control circuitry further comprises droop prevention circuitry configured, when in a start-up mode, to disconnect an output interface of the voltage generation circuitry from the output node during a start-up stage of the voltage generation circuitry.

23. An integrated circuit as claimed in claim 22, wherein in said start-up mode the droop prevention circuitry is further configured to pre-charge the output node to said supplied input voltage.

24. An integrated circuit as claimed in claim 22, wherein following said start-up mode, the control circuitry places said droop prevention circuitry in a live mode where the output interface of the voltage generation circuitry is reconnected to the output node.

25. An integrated circuit as claimed in claim 22, wherein when the voltage generation circuitry is not being used, the control circuitry is configured to disconnect the output interface of the voltage generation circuitry from the output node, and to precharge the output interface to said supplied input voltage.

26. An integrated circuit as claimed in claim 22, wherein said circuit block comprises a series of power switches that are driven by said on-chip supply voltage in a predetermined mode of operation.

27. Circuitry for use in an integrated circuit to control variation in a value of an on-chip voltage supply generated at an output node by voltage generation circuitry of the integrated circuit from a supplied input voltage, the integrated circuit having a circuit block configured to receive the on-chip voltage supply generated by the voltage generation circuitry, during operation of the circuit block, the circuit block presenting a varying load on said output node, the circuitry comprising:
   oscillation circuitry coupled to said output node to provide an additional load on said output node and configured to produce an oscillation signal whose frequency varies as the value of the on-chip voltage supply varies; and
   control circuitry configured to be responsive to a trigger condition to adjust said additional load provided on said output node by said oscillation circuitry, wherein:
   said control circuitry further comprises monitoring circuitry configured to monitor said oscillation signal in order to monitor variation in a value of the on-chip voltage supply generated by the voltage generation circuitry;
   said monitoring circuitry is configured to be responsive to at least one predetermined variation in said oscillation signal to indicate said trigger condition, and the control circuitry being responsive to said trigger condition to cause the power consumption of said oscillation circuitry to be varied in order to vary the amount of said additional load on said output node.

28. A method of controlling variation in a value of an on-chip voltage supply generated at an output node by voltage generation circuitry of an integrated circuit from a supplied input voltage, the integrated circuit having a circuit block arranged to receive the on-chip voltage supply generated by the voltage generation circuitry, during operation of the circuit block, the circuit block presenting a varying load on said output node, the method comprising:

employing oscillation circuitry coupled to said output node to provide an additional load on said output node, the oscillation circuitry producing an oscillation signal whose frequency varies as the value of the on-chip voltage supply varies;

adjusting, in response to a trigger condition, said additional load provided on said output node by the oscillation circuitry;

monitoring said oscillation signal in order to monitor variation in a value of said on-chip voltage supply;

indicating, in response to at least one predetermined variation in said oscillation signal, said trigger condition; and causing, in response to said trigger condition, the power consumption of said oscillation circuitry to be varied in order to vary the amount of said additional load on said output node.

29. An integrated circuit comprising:
voltage generation means for operating from a supplied input voltage and for generating at an output node an on-chip voltage supply different to said supplied input voltage;
circuit means for receiving the on-chip voltage supply generated by the voltage generation means, during operation of the circuit means, the circuit means presenting a varying load on said output node;
oscillation means for coupling to said output node to provide an additional load on said output node, and for producing an oscillation signal whose frequency varies as the value of the on-chip voltage supply varies; and
control means for adjusting, in response to a trigger condition, the additional load provided on the output node by said oscillation means, wherein:
said control means further comprises monitoring means for monitoring said oscillation signal in order to monitor variation in a value of the on-chip voltage supply generated by the voltage generation means;
said monitoring means is responsive to at least one predetermined variation in said oscillation signal to indicate said trigger condition, and the control means, responsive to said trigger condition, for causing the power consumption of said oscillation means to be varied in order to vary the amount of said additional load on said output node.

* * * * *